(12) United States Patent
Togashi

(10) Patent No.: US 10,921,628 B2
(45) Date of Patent: Feb. 16, 2021

(54) INPUT DEVICE

(71) Applicant: SHARP KABUSHIKI KAISHA, Sakai (JP)

(72) Inventor: Yasuyuki Togashi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/628,137

(22) PCT Filed: Jul. 13, 2018

(86) PCT No.: PCT/JP2018/026460
§ 371 (c)(1),
(2) Date: Jan. 2, 2020

(87) PCT Pub. No.: WO2019/017284
PCT Pub. Date: Jan. 24, 2019

(65) Prior Publication Data
US 2020/0218104 A1    Jul. 9, 2020

(30) Foreign Application Priority Data
Jul. 20, 2017    (JP) ................. 2017-140604

(51) Int. Cl.
*G02F 1/1333* (2006.01)
*B06B 1/04* (2006.01)
*B06B 1/06* (2006.01)
*G06F 3/01* (2006.01)
*G06F 3/041* (2006.01)

(52) U.S. Cl.
CPC ............ *G02F 1/13338* (2013.01); *B06B 1/04* (2013.01); *B06B 1/06* (2013.01); *G06F 3/016* (2013.01); *G06F 3/041* (2013.01); *G06F 2203/04105* (2013.01)

(58) Field of Classification Search
CPC ...... G02F 1/13338; G06F 3/016; G06F 3/041; G06F 3/0488; B06B 1/04; B06B 1/06
USPC ....................... 345/156, 173, 174
See application file for complete search history.

(56) References Cited

U.S. PATENT DOCUMENTS 9,678,571 B1 *  6/2017  Robert ................ G06F 3/0488
9,690,382 B1 *  6/2017  Moussette ............ G06F 3/0488
(Continued)

FOREIGN PATENT DOCUMENTS

JP    2013-080364 A    5/2013

*Primary Examiner* — Calvin C Ma
(74) *Attorney, Agent, or Firm* — ScienBiziP, P.C.

(57) ABSTRACT

An input device includes an input member to which a touch operation is input, a touch panel pattern included in the input member and configured to detect an input position of the touch operation, a base member on which the input member is mounted, a pressure sensor disposed on the base member and detecting a pressure that acts on the input member when the input member is pressed by the touch operation, a small vibration actuator configured to apply relatively small vibration to the input member, a large vibration actuator configured to apply relatively large vibration to the input member, and a controller configured to control driving of the small vibration actuator and the large vibration actuator based on the input position detected by the touch panel pattern and the pressure detected by the pressure sensor.

10 Claims, 21 Drawing Sheets

(56) References Cited

U.S. PATENT DOCUMENTS 10,768,750 B2 *  9/2020  Togashi ................ G06F 3/0418
2017/0357317 A1 * 12/2017  Chaudhri ................ G06F 3/016

* cited by examiner

INPUT DEVICE

TECHNICAL FIELD

The present invention relates to an input device.

BACKGROUND ART

The input device described in Patent Document 1 has been known as an example of an input device including a conventional touch screen. In the input device described in Patent Document 1, a display panel for displaying an image for a touch operation and a touch panel provided on the surface of the display panel are supported by a panel support member, and the touch panel is supported by a casing with an elastic support member movably in a vertical direction. By using positional information from a touch panel drive part, a contact position of a finger of a user to the touch panel is controlled such that an actuator drive unit has a different supporting power of the touch panel against a housing of an actuator between the display area of the image for a touch operation and an area other than the display area of the image for a touch operation.

RELATED ART DOCUMENT

Patent Document

Patent Document 1: Japanese Unexamined Patent Application Publication No. 2013-80364

Problem to be Solved by the Invention

The input device described in Patent Document 1, the touch panel is movable in the vertical direction along the Z-axis direction with respect to the casing. The supporting power of the actuator with respect to the touch panel is changed to allow the touch panel to be physically depressed by a user's finger. Therefore, a displacement amount of the touch panel with respect to the casing is necessarily provided with about several millimeters. However, it may be difficult to include such dimensions in design of the device. Furthermore, tactile feedback is performed according to determination whether the touch panel is depressed or not with a user's finger. Therefore, it is difficult to perform various tactile feedbacks according to input positions or a pressing force of the touch operation.

DISCLOSURE OF THE PRESENT INVENTION

The present invention was made in view of the above circumstances. An object is to improve haptic feedback performance.

Means for Solving the Problem

An input device according to the present invention includes an input member an input member to which a touch operation is input, a touch panel pattern included in the input member and configured to detect an input position of the touch operation, a base member on which the input member is mounted, a pressure sensor disposed on the base member and detecting a pressure that acts on the input member when the input member is pressed by the touch operation, a small vibration actuator configured to apply relatively small vibration to the input member, a large vibration actuator configured to apply relatively large vibration to the input member, and a controller configured to control driving of the small vibration actuator and the large vibration actuator based on the input position detected by the touch panel pattern and the pressure detected by the pressure sensor.

According to such a configuration, if the touch operation is input to the input member, the input position is detected by the touch panel pattern. If the input member is pressed with the touch operation, the pressure acting on the input member is detected by the pressure sensor. The controller controls the driving of the small vibration actuator and the large vibration actuator based on the input position detected by the touch panel pattern and the pressure detected by the pressure sensor. For example, if the specific input position is detected by the touch panel pattern, the controller drives the small vibration actuator to apply relatively small vibrations to the input member and the small vibrations are transmit to the inputter that has input the touch operation. The small vibration actuator can control the vibration frequency and the vibration amplitude more finely than the large vibration actuator, and a period of oscillation can be preferably increased. On the other hand, if the specific input position is detected by the touch panel pattern and the pressure detected by the pressure sensor is equal to or greater than the threshold value, the controller drives the large vibration actuator to apply relatively large vibrations to the input member and the large vibrations are transmit to the inputter that has input the touch operation. As described above, the controller controls driving of the small vibration actuator and the large vibration actuator such that different vibrations of large vibrations and small vibrations are transmit to the inputter that has input the touch operation. Therefore, various kinds of haptic feedback can be achieved and the haptic feedback performance can be improved. Compared to the conventional configuration, the displacement amount of the input member with respect to the base member is smaller since the haptic feedback is achieved with vibrations.

Advantageous Effect of the Invention

According to the present invention, haptic feedback performance can be improved.

MODES FOR CARRYING OUT THE INVENTION

First Embodiment

Figure 1:
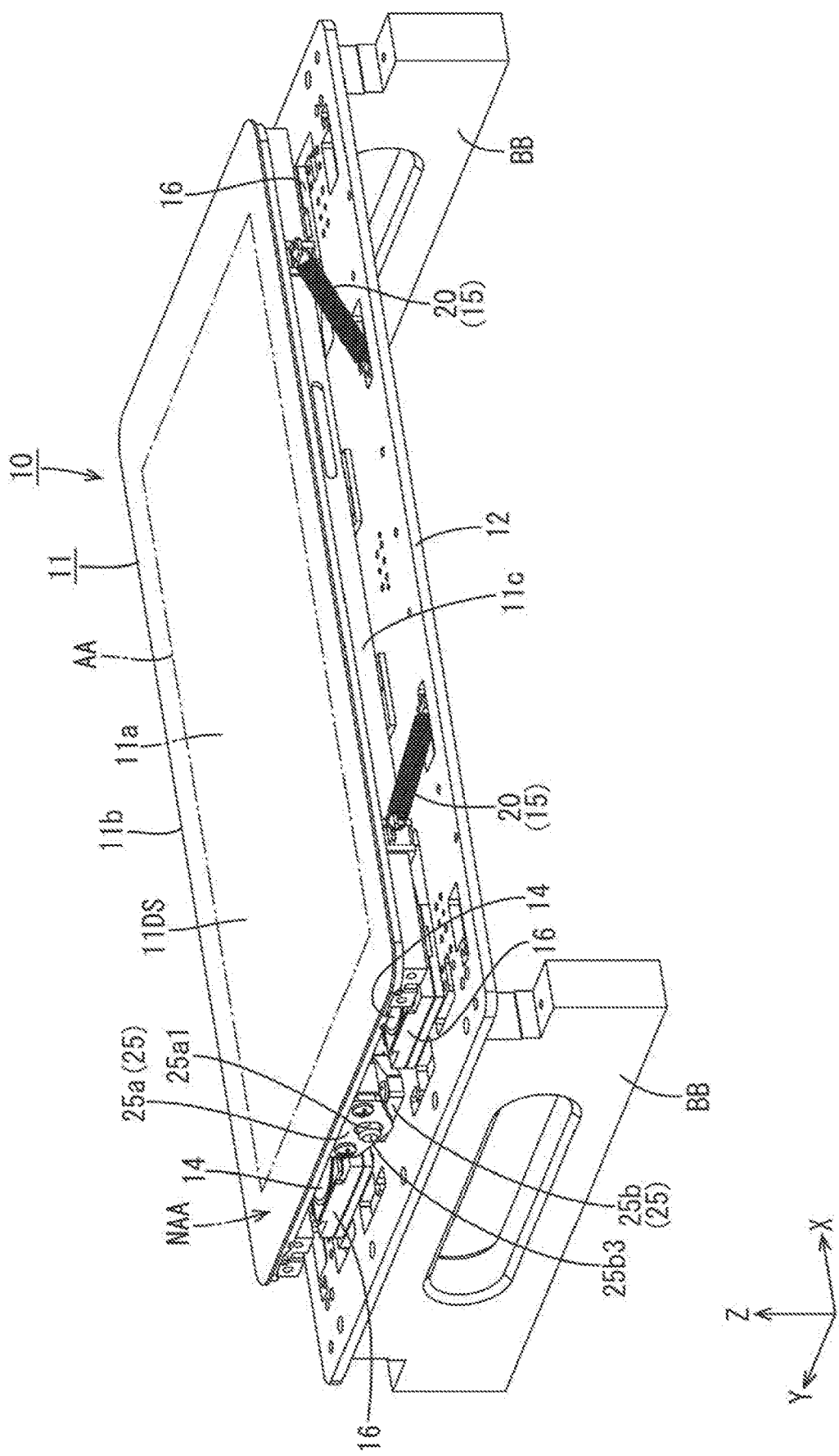
FIG. 1 is a perspective view of an input device according to a first embodiment of the present invention.

The first embodiment of the present invention will be described with reference to FIGS. 1 to 15. This embodiment will exemplify an input device 10 having a haptic feedback function (tactile sensitivity feedback function). X-axes, Y-axes, and Z-axes may be present in the drawings. The axes in each drawing correspond to the respective axes in other drawings. A vertical direction is defined with reference to FIGS. 4, 5, 10, 11, and 12 and an upper side and a lower side in the drawings correspond to a front side and a backside of the liquid crystal panel, respectively.

As illustrated in FIG. 1, the input device 10 at least includes a liquid crystal display device (input member) 11 where an image is displayed and a touch operation (including pressing operation) performed by the user is input and a base member 12 where the liquid crystal display device 11 is mounted. The liquid crystal display device 11 has a touch panel function (a position input function) of detecting an input position (a touch position, a pressing position) designated by the user in addition to a display function of displaying an image. The present embodiment will exemplify the input device 10 used for a car navigation system mounted on a vehicle, and specific applications of the embodiment can be altered as appropriate.

Figure 11:
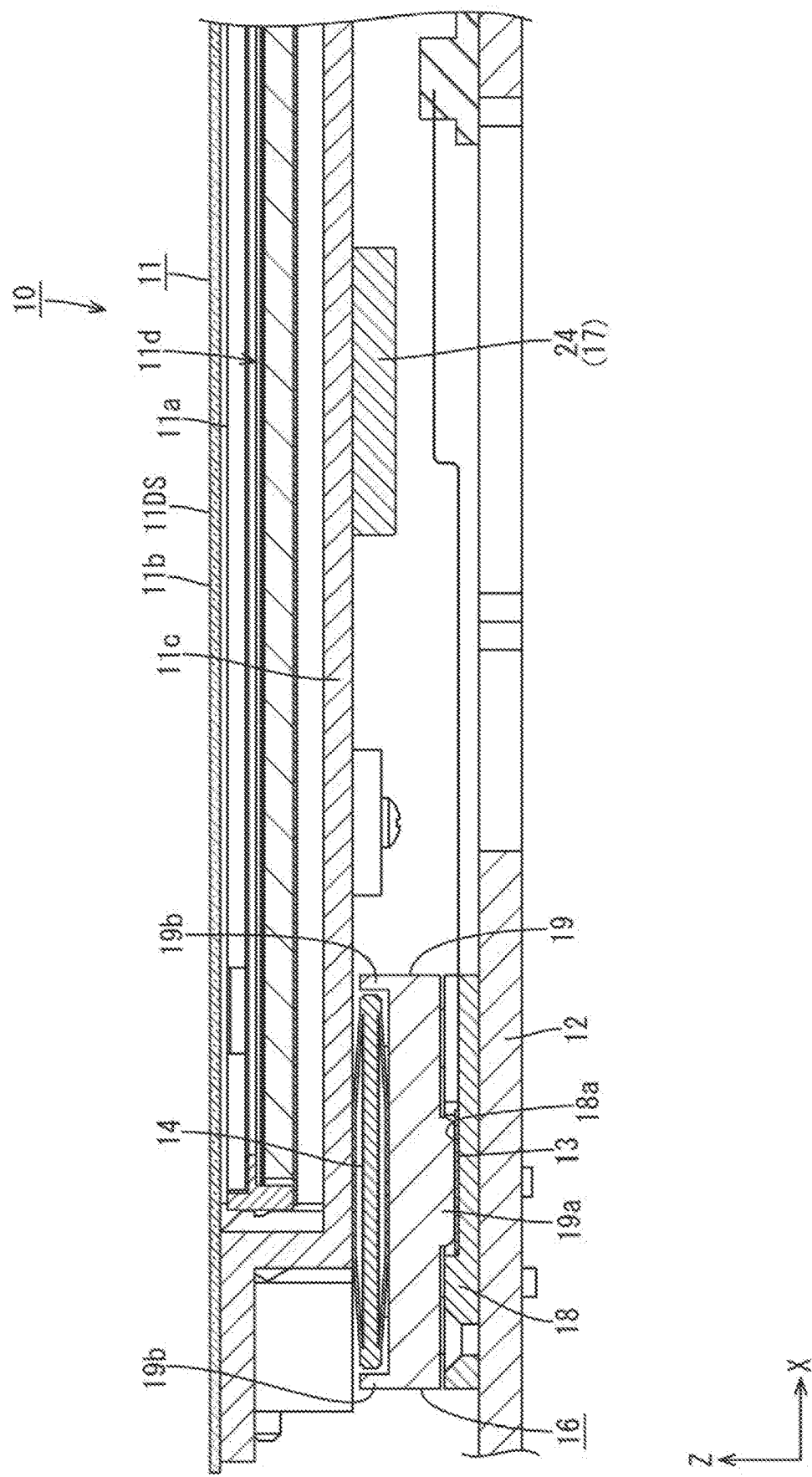
FIG. 11 is an enlarged side sectional view of the actuator unit and the small vibration actuator illustrated in FIG. 10.

As illustrated in FIGS. 1 and 11, the liquid crystal display device 11 at least includes a liquid crystal panel 11a (a display panel) on which an image is displayed, a backlight device 11d, a cover glass 11b (a cover panel, a panel protecting member), a casing 11c. The backlight device 11d is disposed on the back side relative to the liquid crystal panel 11a (on an opposite side from the input side of a touch operation) and configured to supply light used for display on the liquid crystal panel 11a. The cover glass 11b is disposed to overlap the liquid crystal panel 11a on the front side thereof. The liquid crystal panel 11a and the backlight device 11d are arranged in the casing 11c. The liquid crystal panel 11a at least includes a pair of substrates, a liquid crystal layer, and a pair of polarizing plates (the substrates and the liquid crystal layer are not illustrated). The substrates are made of a substantially transparent material, for example, glass and bonded to each other such that their inner surfaces face each other while having a predetermined interval (a cell gap) therebetween. The liquid crystal layer is sealed between the substrates. The polarizing plates are respectively disposed on the outer surfaces of the substrates. Out of the pair of substrates, a CF substrate (a counter substrate) disposed on the front side includes components such as an alignment film in addition to a color filter having color portions such as R (red), G (green), and B (blue) portions arranged in a predetermined arrangement and a light blocking portion (a black matrix) defining each of the adjacent color portions. On the other hand, an array substrate (a TFT substrate) disposed on the back side includes components such as switching elements (for example, TFTs) connected to source lines and gate lines that are perpendicular to each other, pixel electrodes connected to the switching elements, and an alignment film.

Figure 3:
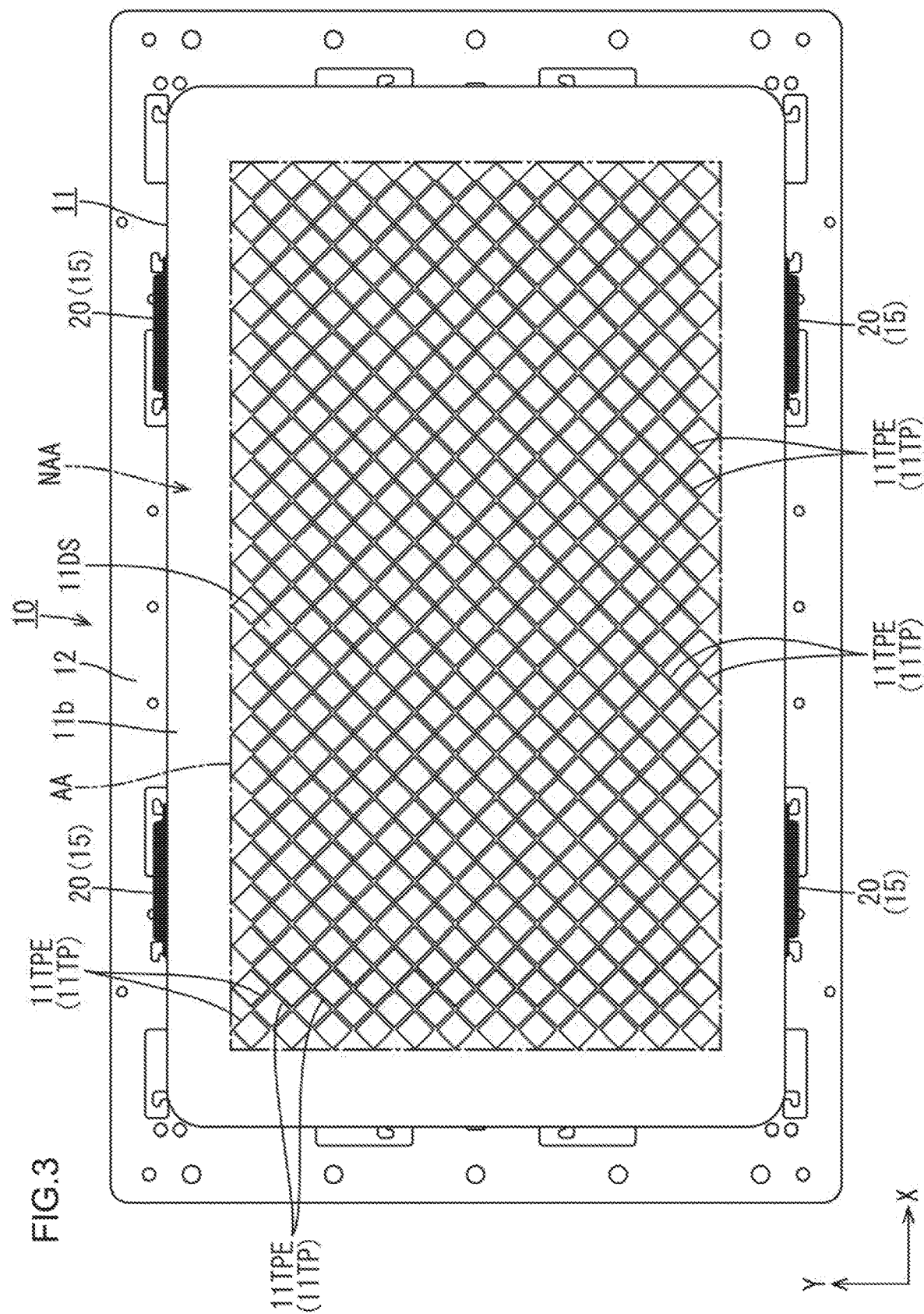
FIG. 3 is a plan view of the input device.
Figure 13:
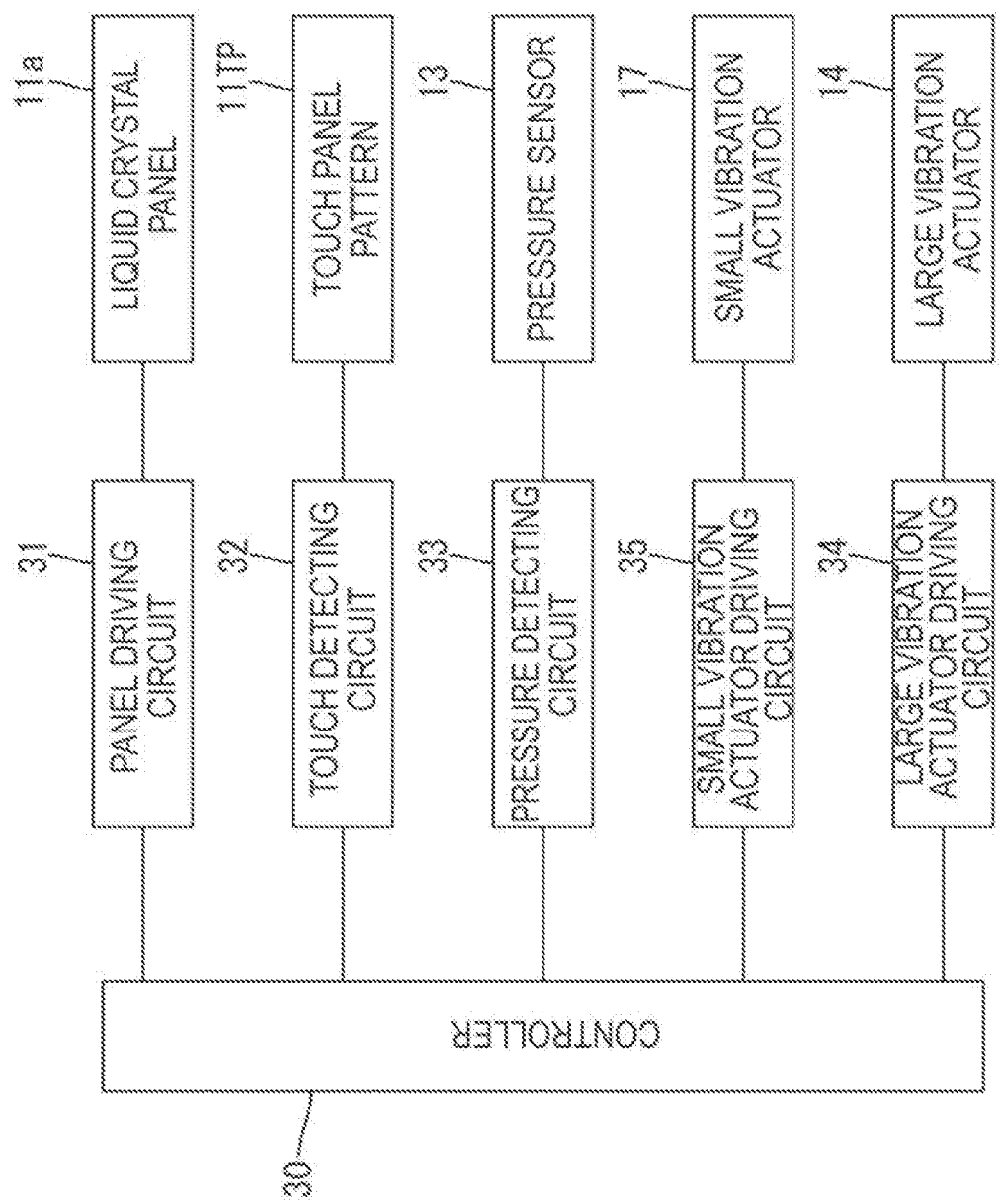
FIG. 13 is a block diagram representing an electric configuration of the input device.

As illustrated in FIG. 3, the liquid crystal panel 11a has a horizontally long rectangular plan view shape and includes a display surface 11DS that is divided into a display area AA (an active area) on which an image is displayed and a non-display area NAA (non-active area) having a frame shape (frame-like shape) surrounding the display area AA. A long-side direction and a short-side direction of the liquid crystal panel 11a correspond to the X-axis direction and the Y-axis direction in each drawing, respectively and a normal direction of the display surface 11DS corresponds to the Z-axis direction in each drawing. In FIG. 3, a chain line represents an outline of the display area AA, and an area outside the chain line is the non-display area NAA. The liquid crystal panel 11a includes a touch panel pattern 11TP (a position detection pattern) for detecting the input position where the user has performed a touch operation. The touch panel pattern 11TP is based on the so-called projected capacitive type and a detection method thereof is, for example, a self-capacitance method. The touch panel pattern 11TP includes at least touch electrodes 11TPE (position detection electrodes) arranged side by side in a matrix pattern in the display area AA. Accordingly, the display area AA of the liquid crystal panel 11a substantially matches a touch area where an input position can be detected, and the non-display area NAA substantially matches a non-touch area where an input position cannot be detected. When the user inputs a touch operation with his/her finger FIN (an inputter) on the basis of an image that is displayed on the display area AA and visually recognized by the user, a capacitance is created between the finger FIN and the touch electrode 11TPE. This causes a change in capacitance detected by the touch electrode 11TPE located near the finger FIN according to the approach of the finger FIN to the touch electrode 11TPE. The capacitance differs from capacitances of the touch electrodes 11TPE located far from the finger FIN. Thus, the input position can be detected. One end portion of a flexible circuit board (not illustrated) is connected to a control board and another end portion of the flexible circuit board is connected to the liquid crystal panel 11a. As illustrated in FIG. 13, the control board at least includes a panel driving circuit 31 and a touch detecting circuit 32. The panel driving circuit 31 is configured to drive the liquid crystal panel 11a to display an image on the display surface 11DS. The touch detecting circuit 32 is configured to drive the touch panel pattern 11TP to detect an input position of a touch operation.

As illustrated in FIG. 1, the cover glass 11b has a horizontally long rectangular shape that is slightly larger than the liquid crystal panel 11a and is configured to protect the liquid crystal panel 11a by covering a substantially entire area of the liquid crystal panel 11a from the front side. The cover glass 11b is made of a substantially transparent glass material having high transmissivity and is preferably made of reinforced glass. As the reinforced glass used for the cover glass 11b, it is preferable to use, for example, a chemically reinforced glass material having a chemically reinforced layer formed on the surface by applying a chemically reinforcing process to the surface of a plate-like glass base material. However, it is not limited thereto. The casing 11c has a substantially box-like shape opening to the front side and includes an accommodation space therein where the liquid crystal panel 11a and the backlight device 11d are arranged.

As illustrated in FIGS. 1 and 3, the base member 12 is a plate member having a horizontally long quadrangular plan view shape and is fixed to base blocks BB mounted on a dashboard (not illustrated) of a vehicle. A pair of base blocks BB are disposed to overlap a pair of short side portions of the outer edge portions of the base member 12, respectively, and are provided so as to protrude from the mount surface of the dashboard toward the front side. The base member 12 is slightly larger than the liquid crystal display device 11 in a plan view and includes holes (thread holes) for the attachment of various types of components (the elastic members 15 and the actuator units 16 which will be described later) in a plate surface thereof. The base blocks BB described above are not required if the base member 12 can be fixed directly to the dashboard.

Figure 2:
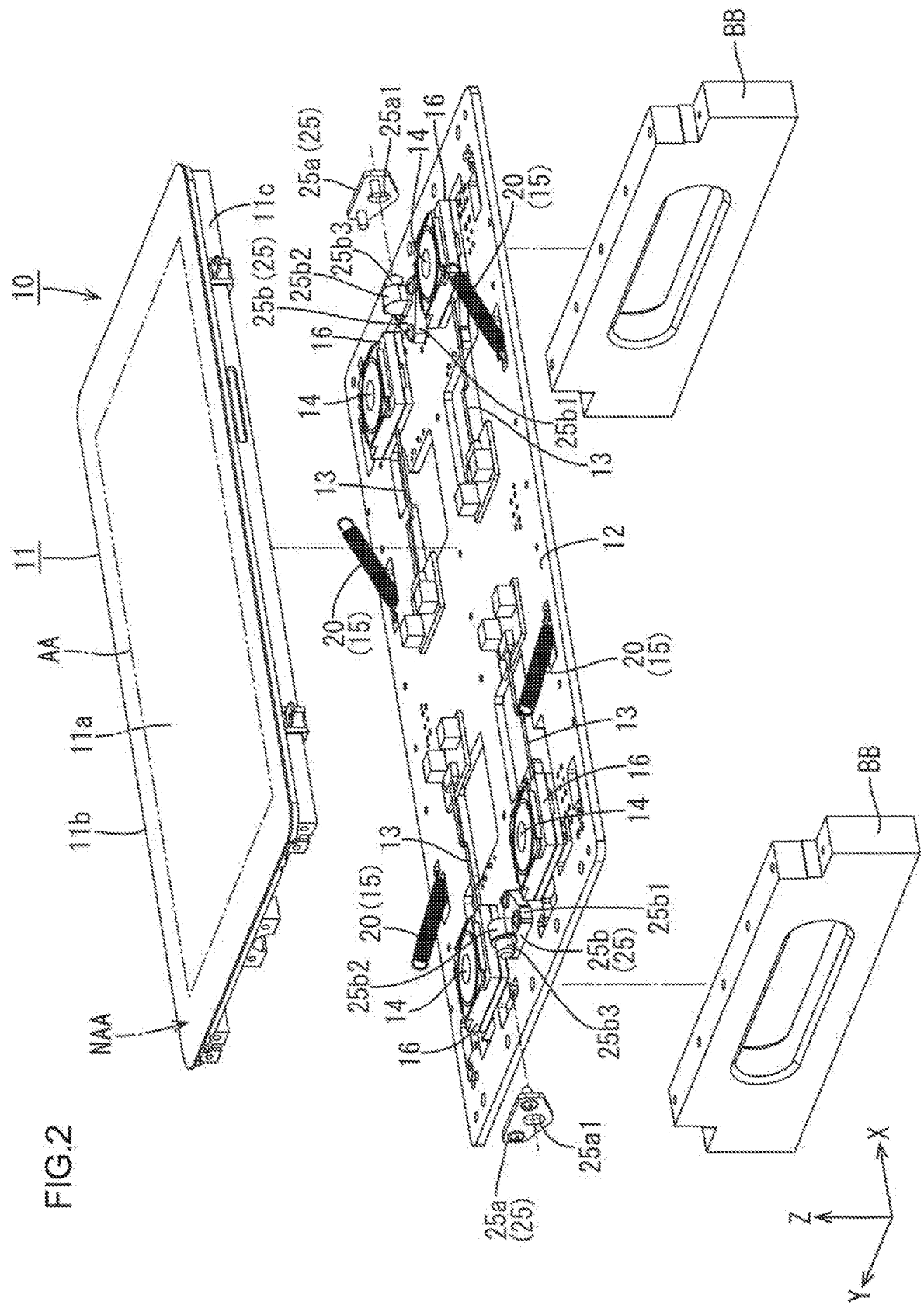
FIG. 2 is an exploded perspective view of the input device.
Figure 7:
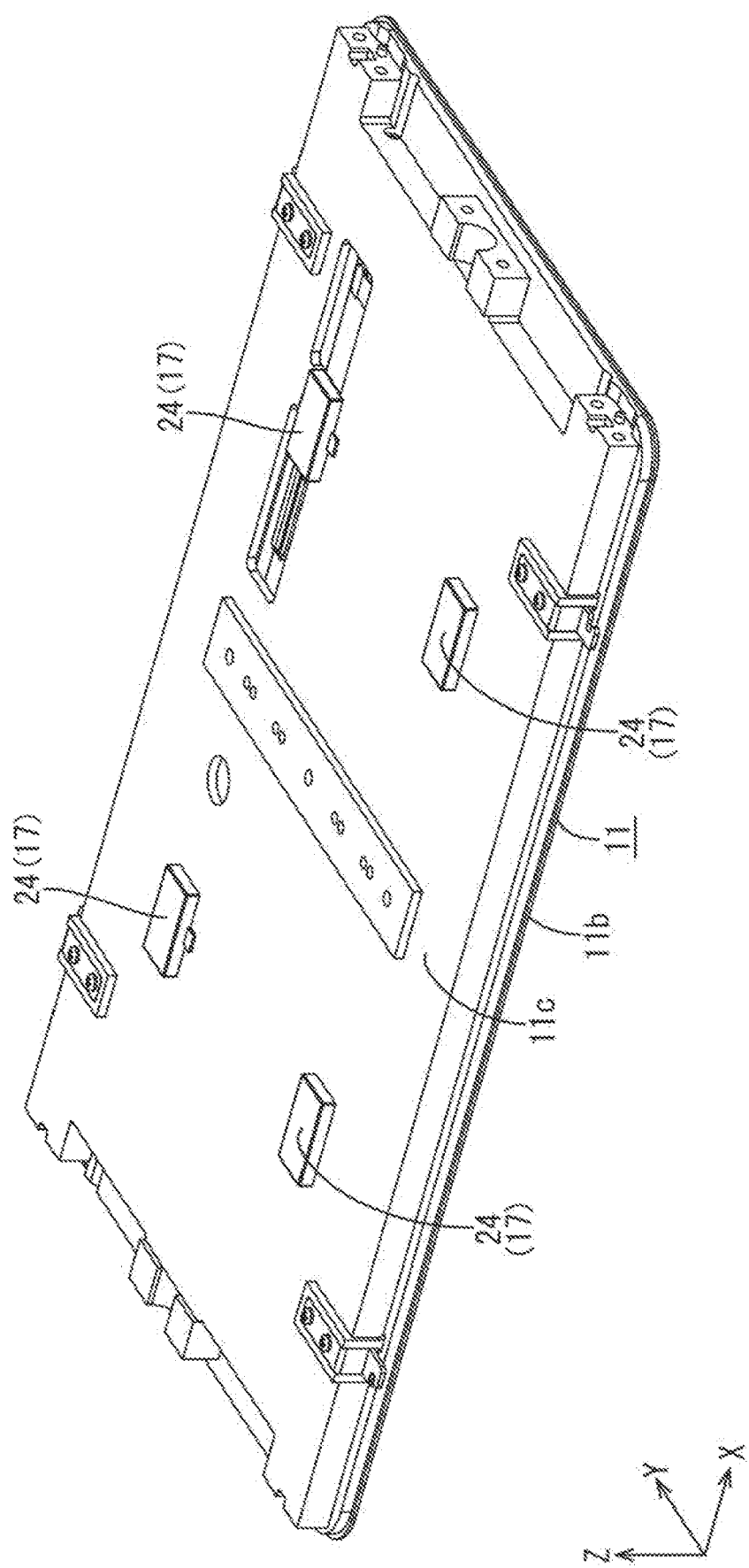
FIG. 7 is a perspective view of a liquid crystal display device included in the input device seen from a back surface side thereof.

As illustrated in FIG. 2, the pressure sensors (pressure-sensitive sensors) 13, large vibration actuators 14 (strong vibration actuator), and the elastic members 15 are at least mounted on the base member 12. The pressure sensors 13 detect the pressure that operates the liquid crystal display device 11 according to a touch operation. The large vibration actuators 14 provide relatively large (strong) vibration to the liquid crystal display device 11. The elastic members 15 elastically support the liquid crystal display device 11 such that the liquid crystal display device 11 can move relative to the base member 12. Out of the components, the pressure sensor 13 and the large vibration actuator 14 are included in the actuator unit 16, which will be described later. As illustrated in FIG. 7, the liquid crystal display device 11 includes at least small vibration actuators 17 (a weak vibration actuator) that apply relatively small vibration to the liquid crystal display device 11. A predetermined space is maintained with respect to the Z-axis direction between the liquid crystal display device 11 and the base member 12 supported by the elastic members 15.

Figure 8:
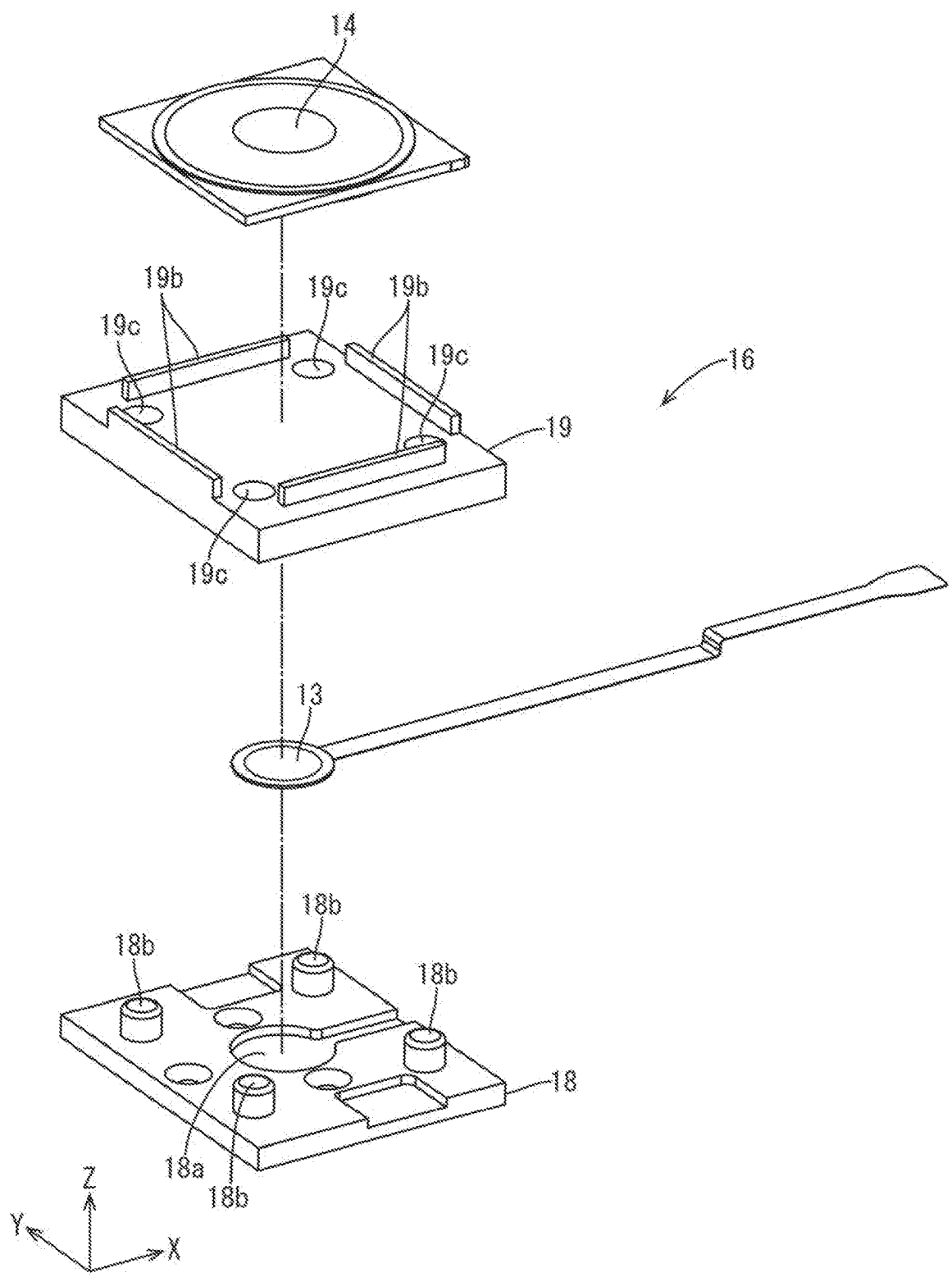
FIG. 8 is an exploded perspective view of an actuator unit included in the input device.

As illustrated in FIGS. 2 and 8, the pressure sensors 13 are so-called pressure-sensitive ink sensors. Each pressure sensor 13 at least includes a pair of films and pressure-sensitive electrodes (not illustrated). The films are made of an insulating material and bonded to each other. The pressure-sensitive electrodes are disposed on inner surfaces of the films to be opposed to each other. A contact resistance between a pair of opposed pressure-sensitive electrodes is changed according to the pressure that operates the pressure sensor 13 in the thickness direction (the Z-axis direction). The pressure sensor 13 can detect pressure by utilizing such a change in the contact resistance. The pressure-sensitive electrodes are formed by, for example, printing pressure-sensitive ink on the film. Each pressure sensor 13 extends along the X-axis direction in a belt-like shape. Each pressure sensor 13 includes one end portion mounted in the actuator unit 16 that is fixed to the base member 12 and the one end portion has a substantially circular plan view shape. The pressure sensor 13 extends outside the actuator unit 16 and includes another end portion that is outside the actuator unit 16 and connected to a control board (not illustrated) via a connector (not illustrated). As illustrated in FIG. 13, the control board at least includes a pressure detecting circuit 33 that is configured to drive the pressure sensor 13 to detect pressure that acts on the liquid crystal display device 11 according to the pressing by the touch operation.

As illustrated in FIGS. 2 and 8, the large vibration actuators 14 has a substantially plate shape having a quadrangular plan view shape. Each large vibration actuator 14 at least includes a piezoelectric element (a piezo element) that is an oscillation source generating vibrations and a displacement magnification mechanism that magnifies displacement created according to the oscillation of the piezoelectric element. The large vibration actuator 14 is a so-called actuator having a displacement magnification mechanism. The large vibration actuator 14 expands and contracts in a thickness direction thereof by the displacement magnified by the displacement magnification mechanism to vibrate. The large vibration actuator 14 vibrates in a vibrating direction that is a first direction and matches the Z-axis direction (a pressing direction by a touch operation, a normal direction of the display surface 11DS). The vibrations applied to the liquid crystal display device 11 by the oscillation of the large vibration actuator 14 are greater than the vibrations applied to the liquid crystal display device 11 by the oscillation of the small vibration actuator 17 in the displacement, the speed, and the acceleration. The large vibration actuator 14 is connected to the control board via a connection member, which is not illustrated. As illustrated in FIG. 13, the control board at least includes a large vibration actuator driving circuit 34 that is configured to control driving of the large vibration actuator 14 for detecting pressure acting on the liquid crystal display device 11 according to the pressing by the touch operation.

Figure 4:
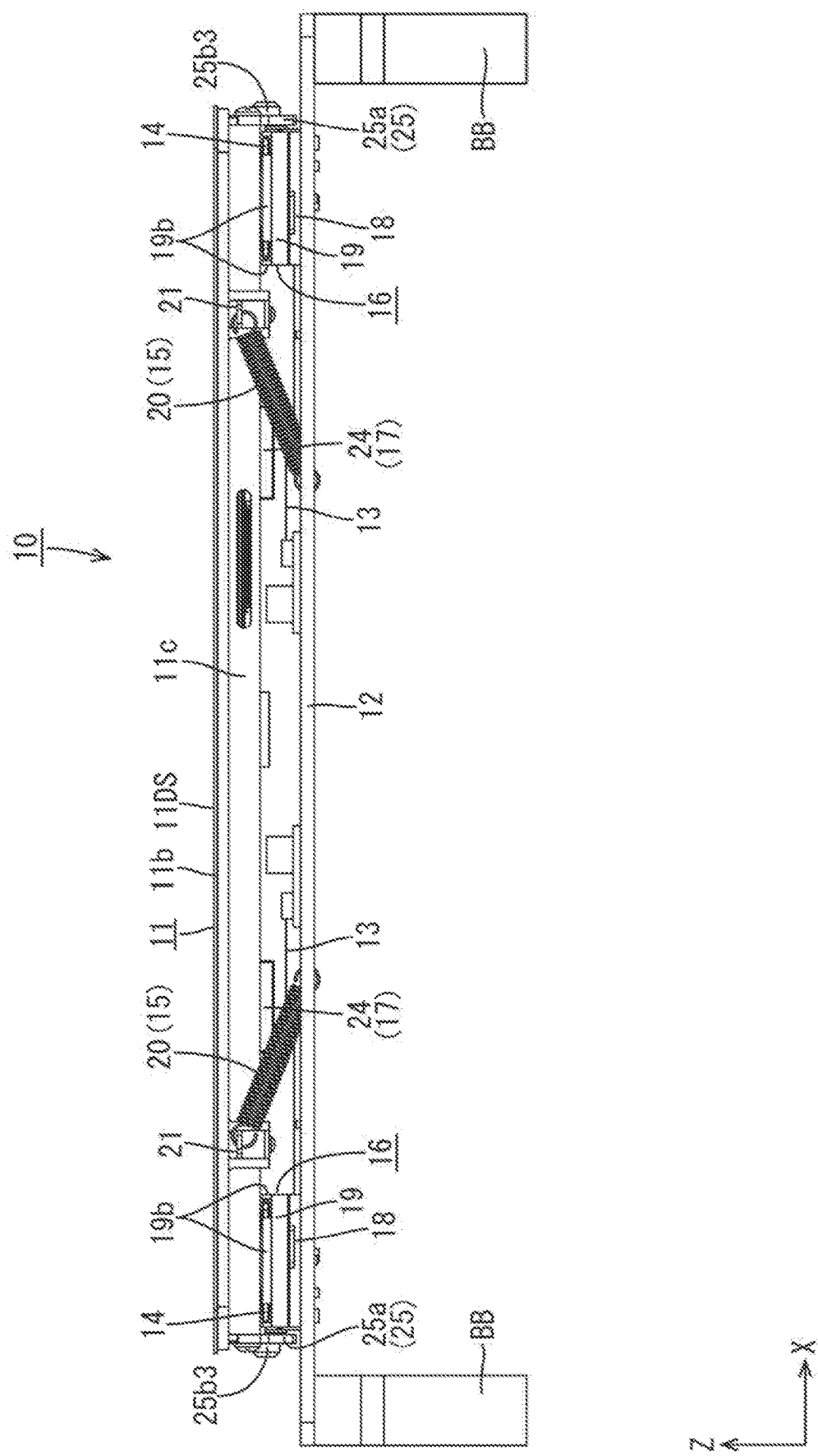
FIG. 4 is a side view of the input device.
Figure 5:
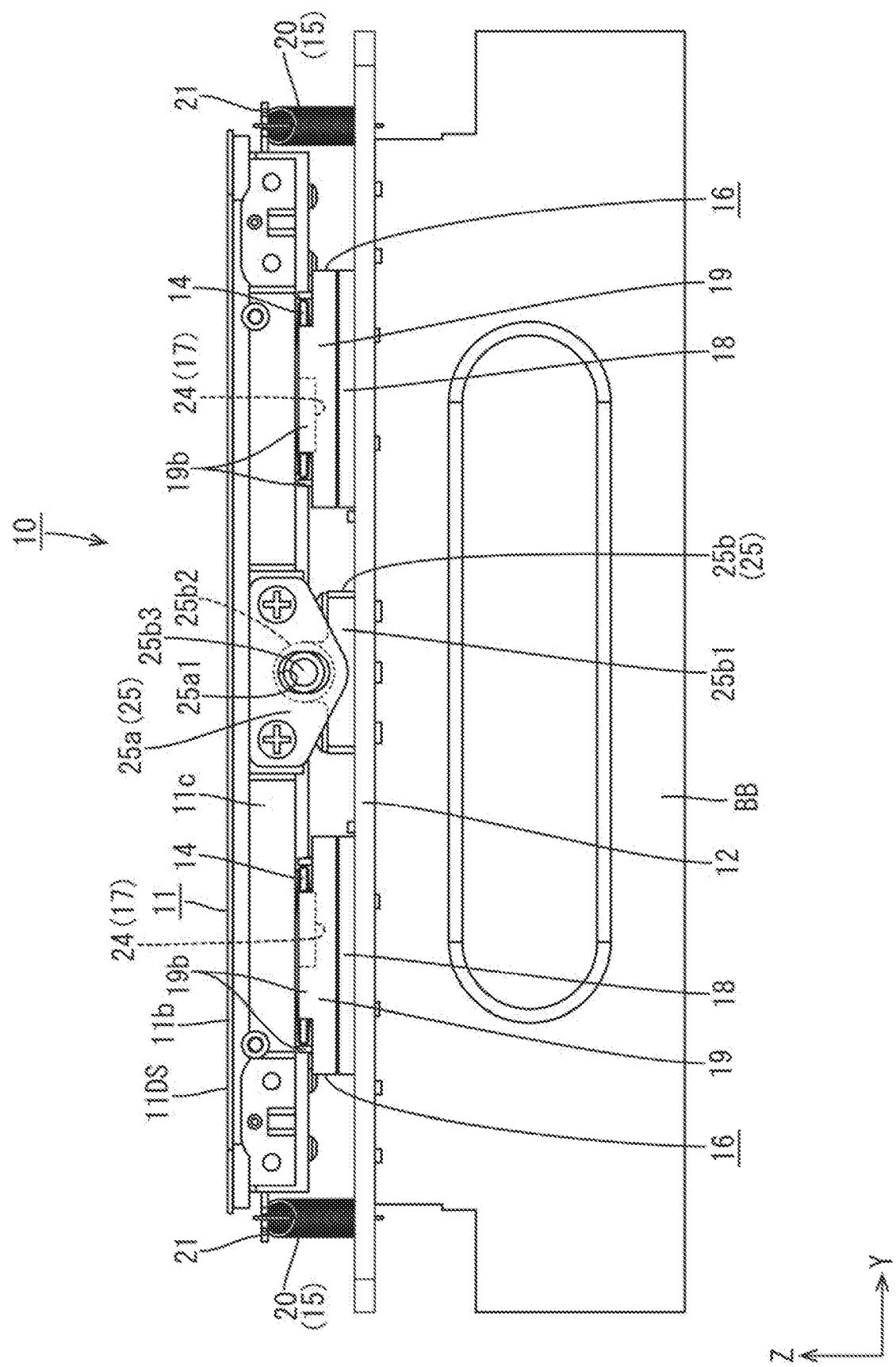
FIG. 5 is a front view of the input device.
Figure 6:
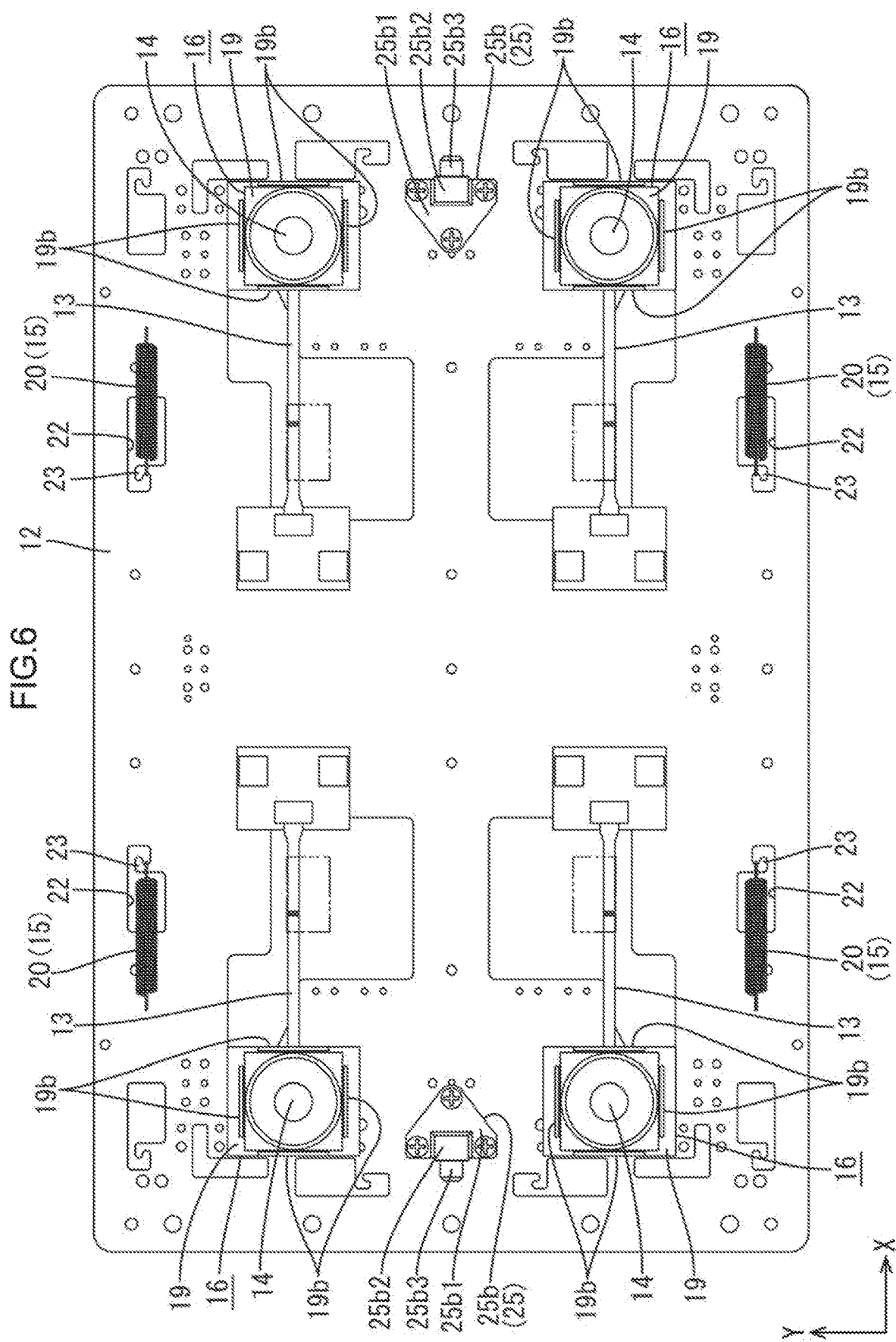
FIG. 6 is a plan view of a base member included in the input device.

The actuator unit 16 that includes the pressure sensor 13 and the large vibration actuator 14 will be described. As illustrated in FIG. 2, the actuator units 16 are mounted on the front surface of the base member 12 and are disposed between the liquid crystal display device 11 and the base member 12 with respect to the Z-axis direction. As illustrated in FIGS. 4 to 6, the four actuator units 16 are respectively arranged near the four corners of the liquid crystal display device 11 and the base member 12 and respectively arranged next to the four elastic members 15 with respect to the Y-axis direction and closer to the middle of the liquid crystal display device 11 and the base member 12 than the elastic members 15 are. The actuator units 16 are disposed adjacent to edges of the liquid crystal display device 11 and the base member 12 with respect to the X-axis direction.

As illustrated in FIGS. 8 and 11, each actuator unit 16 includes a sensor holding member 18 (a sensor holder) that holds the pressure sensor 13, and an actuator holding member 19 (an actuator holder) that holds the large vibration actuator 14, in addition to the pressure sensor 13 and the large vibration actuator 14. The sensor holding member 18 has a plate shape of a substantially quadrangular plan view shape and is fixed to the base member 12 with a screw member such that a back surface thereof is contacted with the base member 12. The sensor holding member 18 includes a sensor arrangement recess portion 18a on a front surface thereof (a surface opposite the actuator holding member 19). The pressure sensor 13 is arranged in the sensor arrangement recess portion 18a. The pressure sensor 13 that is arranged in the sensor arrangement recess portion 18a is disposed between the liquid crystal display device 11 and the sensor holding member 18 while having the large vibration actuator 14 and the actuator holding member 19 therebetween. The sensor holding member 18 includes mount protrusions 18*b* near four corners on the front surface thereof. The mount protrusions 18*b* protrude toward the front side along the Z-axis direction. The four mount protrusions 18*b* do not overlap the sensor arrangement recess portion 18*a* and the pressure sensor 13.

As illustrated in FIGS. 8 and 11, the actuator holding member 19 has a plate shape of a substantially quadrangular plan view shape and is mounted to overlap the sensor holding member 18 from the front side. The actuator holding member 19 includes a sensor-side protrusion 19*a* on a back side surface thereof (a surface opposite the sensor holding member 18). The sensor-side protrusion 19*a* protrudes toward the back side along the Z-axis direction and is inserted in the sensor arrangement recess portion 18*a* of the sensor holding member 18. The sensor-side protrusion 19*a* is to be contacted with the pressure sensor 13 that is arranged in the sensor arrangement recess portion 18*a*. The large vibration actuator 14 is disposed on the front side surface (a surface opposite the liquid crystal display device 11) of the actuator holding member 19 from the front side. The actuator holding member 19 includes positioning protrusions 19*b* that protrude from the front side surface thereof toward the front side along the Z-axis direction. The positioning protrusions 19*b* are for positioning the large vibration actuator 14. The four positioning protrusions 19*b* extend in parallel to four side sections of an outer edge of the large vibration actuator 14, respectively. According to such a configuration, the large vibration actuator 14 that is disposed on the actuator holding member 19 is maintained in a state positioned with respect to the X-axis direction and the Y-axis direction and is less likely to be disposed in an incorrect position. The actuator holding member 19 includes mount recess portions 19*c* near four corner portions thereof and the mount recess portions 19*c* extend through the actuator holding member 19. The mount protrusions 18*b* of the sensor holding member 18 are inserted in the mount recess portions 19*c*, respectively. The four mount recess portions 19*c* do not overlap the positioning protrusions 19*b* but overlap the four corner portions of the large vibration actuator 14, respectively. The large vibration actuator 14 that is held by the actuator holding member 19 having such a configuration is disposed to overlap the pressure sensor 13 in a plan view. According to such a configuration, an arrangement space for the large vibration actuator 14 and the pressure sensor 13 can be reduced. The large vibration actuator 14 is disposed between the liquid crystal display device 11 and the actuator holding member 19 and can be directly contacted with the back side surface of the casing 11*c* of the liquid crystal display device 11.

Figure 9:
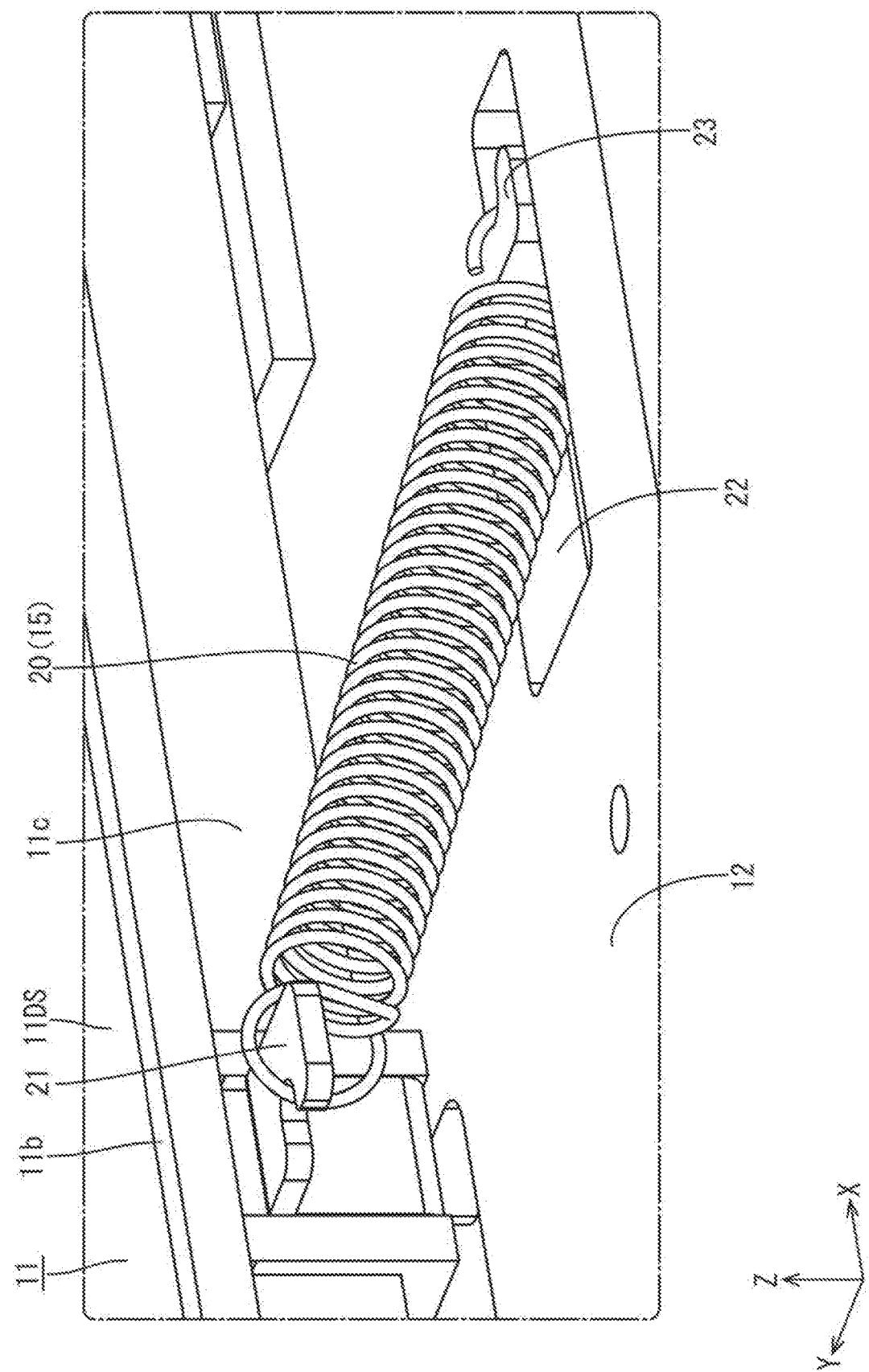
FIG. 9 is an enlarged view of an elastic member included in the input device and therearound.

As illustrated in FIG. 1, the elastic members 15 support the liquid crystal display device 11 to be away from the base member 12 on the front side with respect to the Z-axis direction. As illustrated in FIG. 9, the elastic member 15 is a tension coil spring 20. The tension coil spring 20 stores a resilient force (a restoring force) in the axial direction thereof when the tension coil spring 20 is pulled along the axial direction from an initial state. The tension coil spring 20 is fixed to the liquid crystal display device 11 at one end thereof and fixed to the base member 12 at another end thereof. The tension coil spring 20 is held such that the axial direction thereof crosses the X-axis direction and the Z-axis direction. This reduces an arrangement space in the Z-axis direction where the tension coil spring 20 is disposed while keeping an effective length dimension of the tension coil spring 20. The tension coil spring 20 can be elastically deformed in both of the X-axis direction and the Z-axis direction. As illustrated in FIG. 4, four tension coil springs 20 are respectively disposed next to four actuator units 16 that are disposed near the four corner portions of the liquid crystal display device 11, respectively. The four tension coil springs 20 are disposed next to the four actuator units 16 and closer to the center in the X-axis direction with respect to the four actuator units 16, respectively. As illustrated in FIG. 5, the four tension coil springs 20 are disposed next to and outside the liquid crystal display device 11 and the four actuator units 16, respectively, with respect to the Y-axis direction. The four tension coil springs 20 are disposed so as to be symmetrical with respect to each of the X-axis direction and the Y-axis direction.

As illustrated in FIG. 9, the casing 11*c* of the liquid crystal display device 11 includes first spring mount portions 21 of a hook shape on an outer side surface thereof that extends along the X-axis direction. One end of the tension coil spring 20 is fixed to the first spring mount portion 21. The base member 12 includes spring insertion holes 22 through which another end of the tension coil spring 20 is inserted. The base member 12 includes second spring mount portions 23 of a hook shape on hole edges of the spring insertion holes 22, respectively. Another end of each tension coil spring 20 is fixed to the second spring mount portion 23. According to such a configuration, if the touch operation is input to the liquid crystal display device 11 or the large vibration actuator 14 oscillates, the tension coil springs 20 are elastically deformed in the Z-axis direction (the pressing direction, the oscillating direction of the large vibration actuator 14). On the other hand, if the small vibration actuator 17 oscillates, the tension coil springs 20 are elastically deformed in the X-axis direction (an oscillating direction of the small vibration actuator 17). Further, the tension coil springs 20 always apply the tension force toward the base member 12 to the liquid crystal display device 11 and therefore, the pressure sensors 13 always receive pressure from the liquid crystal display device 11. Accordingly, such a configuration is preferable to cancel time lag that may be caused until the pressure is detected by the pressure sensor 13 after the touch operation is input to the liquid crystal display device 11.

As illustrated in FIG. 7, the small vibration actuator 17 is a linear actuator 24, which is one kind of the inertial actuators. The small vibration actuators 17 are separated from the base member 12 and mounted on the liquid crystal display device 11. Therefore, in this embodiment, the small vibration actuators 17 need not be mounted on the base member 12. The linear actuator 24, which is the small vibration actuator 17, includes a vibrator (a weight) and a coil, which are magnetic member, therein. The vibrator is linearly moved along the X-axis direction reciprocately by using the electric field created by a current flow flowing through the coil, and the linear actuator 24 oscillates. The small vibration actuator 17 can control a vibration frequency and a vibration amplitude more finely than the large vibration actuator 14, and a period of oscillation can be preferably increased. The linear actuator 24 has an elongated block shape extending along the X-axis direction and oscillates in the longitudinal direction thereof. The linear actuator 24 is attached on the back surface of the casing 11*c* of the liquid crystal display device 11 such that the longitudinal direction corresponds to the X-axis direction. Therefore, the small vibration actuator 17 can vibrate the liquid crystal display device 11 in the X-axis direction (a direction perpendicular to the pressing direction of the touch operation). The small vibration actuator 17 vibrates in a vibrating direction that is a second direction and corresponds to the X-axis direction. The vibrations applied to the liquid crystal display device 11 by the oscillation of the small vibration actuator 17 are smaller than the vibrations applied to the liquid crystal display device 11 by the oscillation of the large vibration actuator 14 in all of the displacement, the speed, and the acceleration. The small vibration actuator 17 is connected to the control board via a connection member, which is not illustrated. As illustrated in FIG. 13, the control board at least includes a small vibration actuator driving circuit 35 that is configured to control driving of the small vibration actuator 17 for detecting pressure acting on the liquid crystal display device 11 according to the pressing by the touch operation.

As illustrated in FIG. 7, the small vibration actuators 17 are arranged on the back surface of the casing 11*c* of the liquid crystal display device 11 so as to be away from each other in the X-axis direction and the Y-axis direction. As illustrated in FIGS. 4 to 6, the four small vibration actuators 17 are disposed on an inner side (closer to a middle section) in the X-axis direction and on an outer side (an edge side) in the Y-axis direction with respect to the four actuator units 16 that are disposed near the four corner portions of the base member 12, respectively. The four small vibration actuators 17 are disposed on outer side in the X-axis direction and on an inner side in the Y-axis direction with respect to the four elastic members 15. The small vibration actuators 17 are indicated by chain double-dashed lines in FIG. 6.

As illustrated in FIG. 13, the input device 10 in this embodiment includes a controller 30 that is configured to control driving of the small vibration actuators 17 and the large vibration actuators 14 based on the input positions detected by the touch panel pattern 11TP and the pressures detected by the pressure sensor 13. The controller 30 is included in the control board, which is not illustrated, and is electrically connected to and configured to control a panel driving circuit 31, a touch detecting circuit 32, a pressure detecting circuit 33, a large vibration actuator driving circuit 34, and a small vibration actuator driving circuit 35 that are included in the same control board.

More in detail, as illustrated in FIG. 13, the controller 30 is configured to control the panel driving circuit 31 to control images displayed on the display surface of the liquid crystal panel 11*a*. The controller 30 is configured to control the touch detecting circuit 32 to obtain position information regarding the input positions of the touch operation by a user's finger FIN within a plane surface of the display surface 11DS. Thus, the controller 30 is able to display the image corresponding to the input positions of the touch operation on the display surface 11DS of the liquid crystal panel 11*a*. The controller 30 is configured to control the pressure detecting circuit 33 to obtain information regarding pressure detected by the pressure sensor 13 that is driven by the pressure detecting circuit 33. The controller 30 is configured to control the large vibration actuator driving circuit 34 and the small vibration actuator driving circuit 35 to control timing and a driving period of driving the large vibration actuators 14 and the small vibration actuators 17. Therefore, the controller 30 is able to drive the large vibration actuators 14 and the small vibration actuators 17 at a certain timing and for a certain driving period based on the position information regarding the input positions of the touch operation and the information regarding the pressure detected by the pressure sensor 13.

Figure 12:
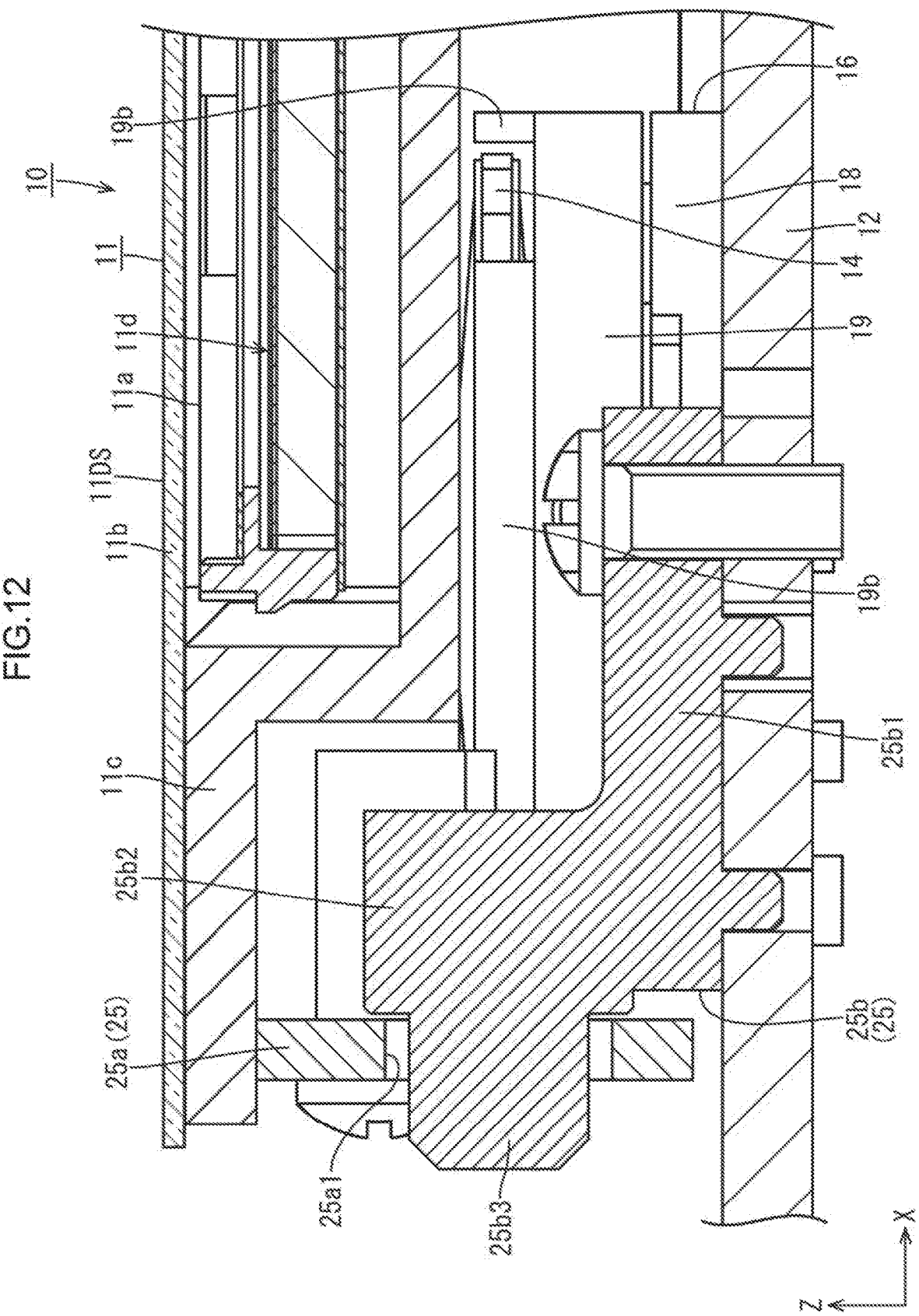
FIG. 12 is a side sectional view of a protrusion and recess fitting structure included in the input device.

As illustrated in FIGS. 2, 5, and 12, the liquid crystal display device 11 and the base member 12 include a protrusion and recess fitting structure 25 including protrusion and recess fitting components that are fitted to each other. The protrusion and recess fitting structure 25 includes a liquid crystal display device side bracket 25*a* (an input member side bracket) that is mounted on the liquid crystal display device 11 and a base member side bracket 25*b* that is fixed to the base member 12. The liquid crystal display device side bracket 25*a* has a substantially plate shape and is mounted on each of a pair of short-side outer edge surfaces of the casing 11*c* of the liquid crystal display device 11. Each of the pair of liquid crystal display device side brackets 25*a* includes a fitting recess portion 25*a*1 in a substantially middle portion thereof and the fitting recess portion 25*a*1 extends through the liquid crystal display device side bracket 25*a*. A pair of base member side brackets 25*b* are disposed between each of the two pairs of actuator units 16 that are disposed along the Y-axis direction on the base member 12. The base member side bracket 25*b* includes a base portion 25*b*1, a projecting portion 25*b*2, and a fitting protrusion 25*b*3. The base portion 25*b*1 is fixed to the base member 12. The projecting portion 25*b*2 projects from the base portion 25*b*1 toward the front side along the Z-axis direction. The fitting protrusion 25*b*3 protrudes from the projecting portion 25*b*2 outwardly along the X-axis direction. The fitting protrusion 25*b*3 has a circular side view shape and can be fit in the fitting recess portion 25*a*1 from an inner side. The fitting recess portion 25*a*1 has an oval side view shape having a long axial direction that matches the Z-axis direction and a short axial direction that corresponds to the Y-axis direction. The fitting recess portion 25*a*1 has a short-axial dimension and a long-axial dimension. The short-axial dimension is substantially same as a diameter dimension of the fitting protrusion 25*b*3 and the long-axial dimension is greater than the short-axial dimension and the diameter dimension of the fitting protrusion 25*b*3. Therefore, when the fitting protrusion 25*b*3 is fit in the fitting recess portion 25*a*1, the liquid crystal display device side bracket 25*a* and the liquid crystal display device 11 are allowed to relatively move with respect to the base member side bracket 25*b* and the base member 12 in the Z-axis direction but the relative movement thereof in the Y-axis direction is restricted. The liquid crystal display device side bracket 25*a* is disposed such that the inner plate surface thereof is opposite and spaced from the outer side surface of the projecting portion 25*b*2 of the base member side bracket 25*b* in the X-axis direction. Accordingly, the liquid crystal display device side bracket 25*a* and the liquid crystal display device 11 are allowed to relatively move with respect to the base member side bracket 25*b* in the X-axis direction. As described above, the protrusion and recess fitting structure 25 allows the liquid crystal display device 11 to relatively move with respect to the base member 12 in the X-axis direction (the second direction) and the Z-axis direction (the first direction) and restrict relative movement of the liquid crystal display device 11 with respect to the base member 12 in the Y-axis direction (a third direction) that is perpendicular to the X-axis direction and the Z-axis direction.

Figure 14:
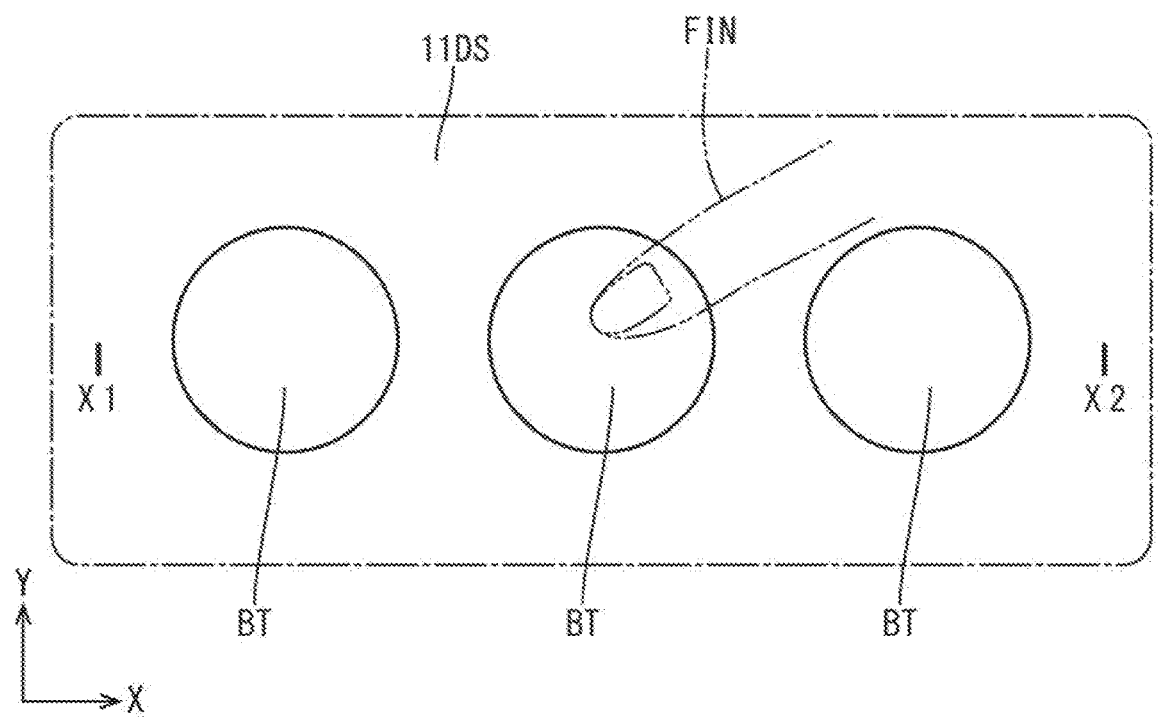
FIG. 14 is an example of an image displayed on a liquid crystal panel of the liquid crystal display device included in the input device.

The present embodiment has the above-described configuration and operations thereof will be described next. As illustrated in FIG. 14, a certain image is displayed on the display surface 11DS of the liquid crystal panel 11*a* of the liquid crystal display device 11 by the panel driving circuit 31 controlled by the controller 30. FIG. 14 illustrates an example of images displayed on the display surface 11DS and circular areas illustrated in the drawing represent buttons BT. In FIG. 14, three buttons BT are arranged at intervals along the X-axis direction. The user touches the surface of the cover glass 11*b* with his/her finger FIN or put his/her finger FIN closer to the surface of the cover glass 11*b* based on the image displayed on the display surface 11DS to input the touch operation to the display surface 11DS within a surface area thereof. Then, the input position is detected by the touch panel pattern 11TP and the touch detecting circuit 32 that are controlled by the controller 30.

Figure 15:
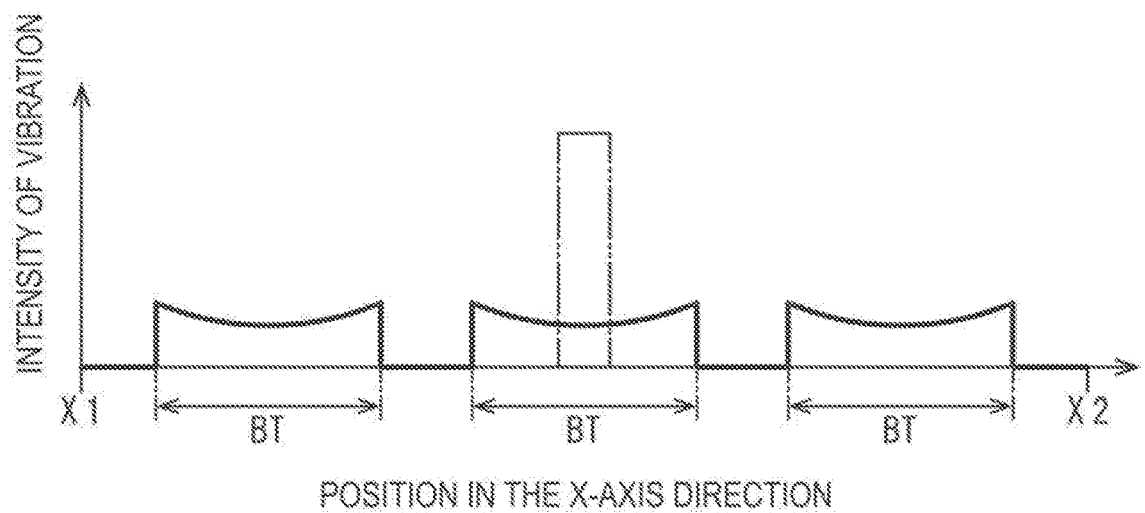
FIG. 15 is a graph representing changes in vibrations from X1 to X2 on the liquid crystal panel of the liquid crystal display device included in the input device.

As illustrated in FIG. 13, the controller 30 obtains the position information regarding the input position detected by the touch panel pattern 11TP and the touch detecting circuit 32 and controls the small vibration actuator driving circuit 35 based on the position information. Namely, as illustrated in FIG. 15, the controller 30 controls the small vibration actuator driving circuit 35 not to drive the small vibration actuator 17 if the detected input position does not correspond to the position of the button BT included in the display image and controls the small vibration actuator driving circuit 35 to drive the small vibration actuator 17 if the detected input position corresponds to the position of the button BT included in the display image. FIG. 15 illustrates graphs obtained by plotting intensities of vibrations that are transmitted to the liquid crystal display device 11 from X1 position to X2 position along the X-axis direction on the display surface 11DS of the liquid crystal panel 11a. A horizontal axis in the drawing represents the positions in the X-axis direction and a vertical axis represents the intensity of the vibrations. The intensity of the vibrations represented by the vertical axis represents acceleration that is particularly important for the user to recognize the vibration among the displacement, the speed, and the acceleration when each actuator 14, 17 oscillates. In FIG. 15, the graph representing the intensity of the vibrations transmitted to the liquid crystal display device 11 according to the oscillation of the small vibration actuator 17 is illustrated with solid lines and the graph representing the intensity of the vibration transmitted to the liquid crystal display device 11 according to the oscillation of the large vibration actuator 14 is illustrated with a chain double-dashed line. X1 and X2 described on the horizontal axis in FIG. 15 correspond to the positions designated by the same symbols described in FIG. 14.

Figure 10:
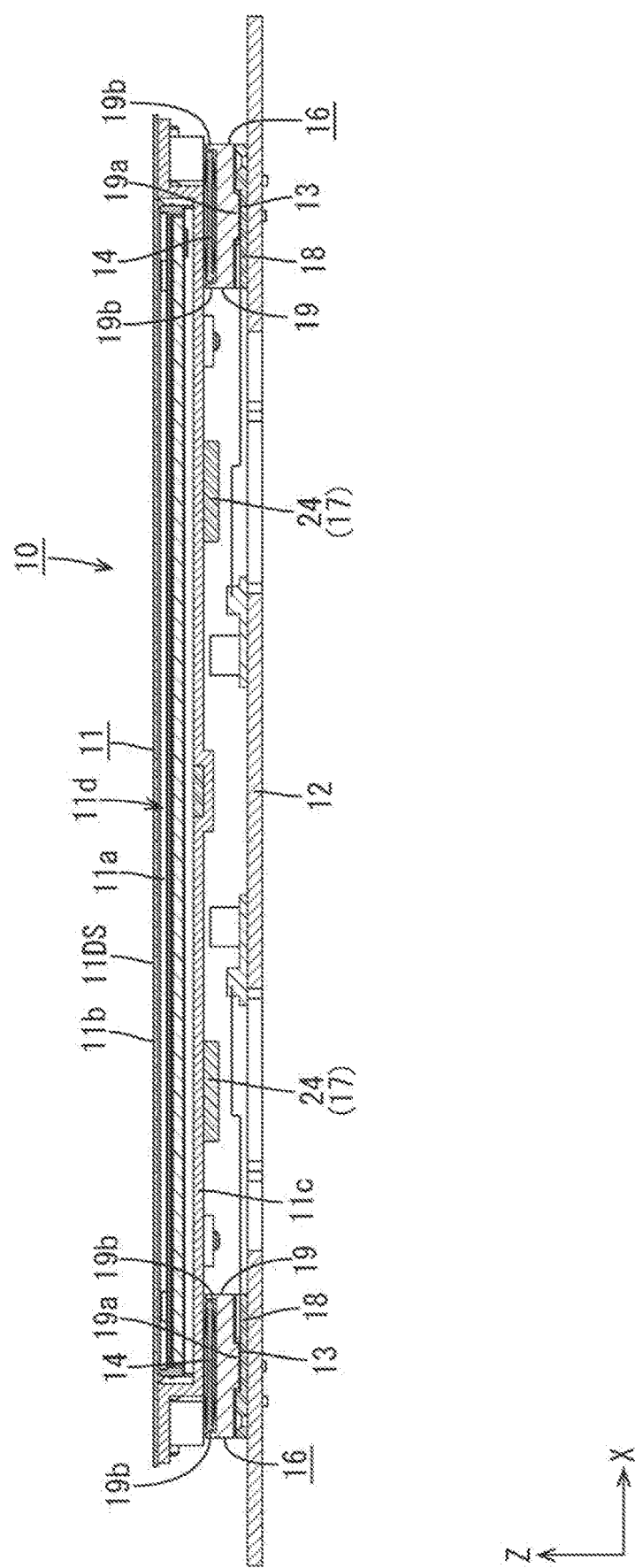
FIG. 10 is a side sectional view of the actuator unit and a small vibration actuator included in the input device.

As illustrated in FIGS. 10 and 11, when the small vibration actuator 17 oscillates, the liquid crystal display device 11 is vibrated relatively weakly along the X-axis direction. Therefore, a user feels with his/her finger FIN as if the button BT moves slightly downward in the Z-axis direction by lateral force fields. Accordingly, the user can recognize the position of the button BT with feeling of touch even if he/she performs the touch operation without seeing the display surface 11DS, namely, a touch-typing operation. As illustrated in FIG. 9, when the liquid crystal display device 11 vibrates in the X-axis direction, the tension coil springs 20 that are the elastic members 15 and fixed to the liquid crystal display device 11 and the base member 12 are elastically deformed in the X-axis direction to allow the liquid crystal display device 11 to move relatively to the base member 12 in the X-axis direction. Furthermore, as illustrated in FIG. 12, since the liquid crystal display device side bracket 25a of the protrusion and recess fitting structure 25 is disposed to be spaced from the projecting portion 25b2 of the base member side bracket 25b in the X-axis direction, the liquid crystal display device 11 can move in the X-axis direction relatively to the base member 12.

When the user presses the display surface 11DS in the Z-axis direction to perform the pressing operation while placing his/her finger FIN on the button BT of the image, as illustrated in FIGS. 10 and 11, the liquid crystal display device 11 is moved relatively to and closer to the base member 12 in the Z-axis direction and the pressure sensor 13 included in the actuator unit 16 is pressed by the liquid crystal display device 11 via the large vibration actuator 14 and the actuator holding member 19. The pressure applied to the pressure sensor 13 is detected by the pressure detecting circuit 33 and the controller 30 obtains information regarding the detected pressure. If the input position detected by the touch panel pattern 11TP and the touch detecting circuit 32 corresponds to the position of the button BT of the display image and the pressure detected by the pressure sensor 13 and the pressure detecting circuit 33 is greater than the predetermined threshold value as illustrated in FIG. 15, the controller 30 controls the large vibration actuator driving circuit 34 to drive the large vibration actuator 14. On the other hand, even if the pressure detected by the pressure sensor 13 and the pressure detecting circuit 33 is greater than the predetermined threshold value, the controller 30 controls the large vibration actuator driving circuit 34 not to drive the large vibration actuator 14 in the following cases. If the input position detected by the touch panel pattern 11TP and the touch detecting circuit 32 does not correspond to the position of the button BT of the display image or if the input position detected by the touch panel pattern 11TP and the touch detecting circuit 32 corresponds to the position of the button BT of the display image and the pressure detected by the pressure sensor 13 and the pressure detecting circuit 33 is not greater than the predetermined threshold value, the controller 30 determines that the user does not press the button BT with his/her finger FIN and controls the large vibration actuator driving circuit 34 not to drive the large vibration actuator 14. Accordingly, the input errors that may be caused when the user touches the cover glass 11b by mistake without having an input intension are appropriately eliminated.

If the large vibration actuator 14 oscillates, as illustrated in FIGS. 10 and 11, the liquid crystal display device 11 vibrates relatively greatly along the Z-axis direction. Therefore, the user feels with his/her finger FIN as if the button BT is lowered greatly in the Z-axis direction and the button BT reaches the lowest level (depressed to the lowest level). Accordingly, when performing the touch-typing operation, the user can receive feeling of clicking of depressing the button BT. When the liquid crystal display device 11 is vibrated in the Z-axis direction, as illustrated in FIG. 9, the tension coil springs 20 that are the elastic members 15 and fixed to the liquid crystal display device 11 and the base member 12 are elastically deformed in the Z-axis direction to allow the liquid crystal display device 11 to move relatively to the base member 12 in the Z-axis direction. Furthermore, in the liquid crystal display device side bracket 25a of the protrusion and recess fitting structure 25, since the long-axial dimension of the fitting recess portion 25a1 is greater than the diameter dimension of the fitting protrusion 25b3, the liquid crystal display device 11 is allowed to move relatively to the base member 12 in the Z-axis direction.

As described above, the controller 30 controls driving of the small vibration actuator 17 and the large vibration actuator 14 such that different vibrations of large vibrations and small vibrations are transmit to the finger FIN of the user who has input the touch operation. Therefore, various kinds of haptic feedback can be achieved and the haptic feedback performance can be improved. Compared to the conventional configuration, the displacement amount of the liquid crystal display device 11 with respect to the base member 12 is smaller since the haptic feedback is achieved with vibrations.

As illustrated in FIGS. 2 and 6, the actuator units 16 including the pressure sensors 13 and the large vibration actuators 14 are disposed near the four corner portions of the liquid crystal display device 11. Therefore, the pressure can be properly detected by the pressure sensors 13 disposed at the four corner portions of the liquid crystal display device 11 regardless of the positions within the liquid crystal display device 11 having a quadrangular plan view shape on which pressing is performed by the touch operation. The liquid crystal display device 11 can be vibrated greatly as a whole by the large vibration actuators 14 disposed at the four corner portions of the liquid crystal display device 11.

As described above, the input device 10 in this embodiment includes the liquid crystal display device 11 (the input member), the touch panel pattern 11TP, the base member 12, the pressure sensor 13, the small vibration actuator 17, the large vibration actuator 14, and the controller 30. The touch operation is input to the liquid crystal display device 11. The touch panel pattern 11TP is included in the liquid crystal display device 11 and is for detecting the input position of the touch operation. The liquid crystal display device 11 is mounted on the base member 12. The pressure sensor 13 is mounted on the base member 12 and detects the pressure acting on the liquid crystal display device 11 when the liquid crystal display device 11 is pressed by the touch operation. The small vibration actuator 17 applies relatively small vibrations to the liquid crystal display device 11 and the large vibration actuator 14 applies relatively large vibrations to the liquid crystal display device 11. The controller 30 controls the driving of the small vibration actuator 17 and the large vibration actuator 14 based on the input position detected by the touch panel pattern 11TP and the pressure detected by the pressure sensor 13.

According to such a configuration, if the touch operation is input to the liquid crystal display device 11, the input position is detected by the touch panel pattern 11TP. If the liquid crystal display device 11 is pressed with the touch operation, the pressure acting on the liquid crystal display device 11 is detected by the pressure sensor 13. The controller 30 controls the driving of the small vibration actuator 17 and the large vibration actuator 14 based on the input position detected by the touch panel pattern 11TP and the pressure detected by the pressure sensor 13. For example, if the specific input position is detected by the touch panel pattern 11TP, the controller 30 drives the small vibration actuator 17 to apply relatively small vibrations to the liquid crystal display device 11 and the small vibrations are transmit to the inputter that has input the touch operation. The small vibration actuator 17 can control the vibration frequency and the vibration amplitude more finely than the large vibration actuator 14, and a period of oscillation can be preferably increased. On the other hand, if the specific input position is detected by the touch panel pattern 11TP and the pressure detected by the pressure sensor 13 is equal to or greater than the threshold value, the controller 30 drives the large vibration actuator 14 to apply relatively large vibrations to the liquid crystal display device 11 and the large vibrations are transmit to the inputter that has input the touch operation. As described above, the controller 30 controls driving of the small vibration actuator 17 and the large vibration actuator 14 such that different vibrations of large vibrations and small vibrations are transmit to the inputter that has input the touch operation. Therefore, various kinds of haptic feedback can be achieved and the haptic feedback performance can be improved. Compared to the conventional configuration, the displacement amount of the liquid crystal display device 11 with respect to the base member 12 is smaller since the haptic feedback is achieved with vibrations.

The small vibration actuator 17 vibrates the liquid crystal display device 11 in a direction perpendicular to the pressing direction of the touch operation and the large vibration actuator 14 vibrates the liquid crystal display device 11 in the pressing direction. According to such a configuration, when the controller 30 drives the small vibration actuator 17, relatively small vibrations in the direction perpendicular to the pressing direction of the touch operation are applied to the liquid crystal display device 11. The liquid crystal display device 11 vibrates weakly in the direction perpendicular to the pressing direction so that the inputter of the touch operation recognizes as if the inputter presses down slightly in the pressing direction by lateral force fields. When the controller 30 drives the large vibration actuator 14, relatively large vibrations in the pressing direction of the touch operation are applied to the liquid crystal display device 11. The liquid crystal display device 11 vibrates greatly in the pressing direction so that the inputter of the touch operation recognizes as if the inputter presses down greatly in the pressing direction.

The large vibration actuators 14 and the pressure sensors 13 are disposed to overlap each other, respectively. According to such a configuration, an arrangement space for the large vibration actuators 14 and the pressure sensors 13 is reduced.

The liquid crystal display device 11 has a quadrangular plan view shape and the large vibration actuators 14 and the pressure sensors 13 are disposed at the four corner portions of the liquid crystal display device 11, respectively. According to such a configuration, the pressure can be properly detected by the pressure sensors 13 disposed at the four corner portions of the liquid crystal display device 11 regardless of the positions within the liquid crystal display device 11 having a quadrangular plan view shape on which pressing is performed by the touch operation. The liquid crystal display device 11 can be vibrated appropriately as a whole by the large vibration actuators 14 disposed at the four corner portions of the liquid crystal display device 11.

The elastic members 15 are fixed to the liquid crystal display device 11 and the base member 12 and are elastically deformable in the first direction that is the vibrating direction of the large vibration actuator 14 and in the second direction that is the vibrating direction of the small vibration actuator 17. According to such a configuration, if the liquid crystal display device 11 is pressed by the touch operation, the elastic members 15 that are fixed to the liquid crystal display device 11 and the base member 12 are elastically deformed in the first direction, which is the vibrating direction of the large vibration actuator 14 and is the pressing direction of the touch operation, to allow the liquid crystal display device 11 to move relatively to the base member 12. Accordingly, the pressure acting on the liquid crystal display device 11 can be detected appropriately by the pressure sensors 13 and the input errors are appropriately eliminated. When the large vibration actuator 14 oscillates, the elastic members 15 that are fixed to the liquid crystal display device 11 and the base member 12 are elastically deformed in the first direction to allow the liquid crystal display device 11 to move relatively to the base member 12. When the small vibration actuator 17 oscillates, the elastic members 15 that are fixed to the liquid crystal display device 11 and the base member 12 are elastically deformed in the second direction, which is the vibrating direction of the small vibration actuator 17, to allow the liquid crystal display device 11 to move relatively to the base member 12.

The elastic member 15 is the tension coil spring 20 one end of which is fixed to the liquid crystal display device 11 and another end of which is fixed to the base member 12. According to such a configuration, when the liquid crystal display device 11 is pressed by the touch operation or the large vibration actuator 14 oscillates, the tension coil spring 20 is elastically deformed in the first direction. When the small vibration actuator 17 oscillates, the tension coil spring 20 is elastically deformed in the second direction. Furthermore, since the tension coil spring 20 always applies the liquid crystal display device 11 with the tension force toward the base member 12, the pressure always acts on the pressure sensor 13 from liquid crystal display device 11. Accordingly, such a configuration is preferable to cancel time lag that may be caused until the pressure is detected by the pressure sensor 13 after the touch operation is input to the liquid crystal display device 11.

The protrusion and recess fitting structure 25 is included in the liquid crystal display device 11 and the base member 12 and protrusion and recess components of the protrusion and recess fitting structure 25 are fit to each other. The protrusion and recess fitting structure 25 allows the liquid crystal display device 11 to relatively move with respect to the base member 12 in the first direction, which is the vibrating direction of the large vibration actuator 14, and in the second direction, which is the vibrating direction of the small vibration actuator 17, and restricts relative movement of the liquid crystal display device 11 with respect to the base member 12 in the third direction, which is perpendicular to the first direction and the second direction. According to such a configuration, when the liquid crystal display device 11 is pressed by the touch operation or when the large vibration actuator 14 oscillates, the protrusion and recess fitting structure 25 allows the liquid crystal display device 11 to move in the first direction relatively to the base member 12. Accordingly, the pressure acting on the liquid crystal display device 11 is properly detected by the pressure sensor 13 and the input errors are appropriately eliminated. When the small vibration actuator 17 oscillates, the protrusion and recess fitting structure 25 allows the liquid crystal display device 11 to move in the second direction relatively to the base member 12. The protrusion and recess fitting structure 25 restricts relative movement of the liquid crystal display device 11 with respect to the base member 12 in the third direction, which is perpendicular to the first direction and the second direction. Therefore, the liquid crystal display device 11 is less likely to be moved from a correct position with respect to the base member 12 in the third direction by the influences of the oscillations of the small vibration actuator 17 and the large vibration actuator 14.

The large vibration actuator 14 at least includes the oscillation source that generates vibrations and the displacement magnification mechanism that magnifies displacement created according to the oscillation of the oscillation source. According to such a configuration, when the oscillation source oscillates, the displacement that is created in the large vibration actuator 14 is magnified by the displacement magnification mechanism. Thus, large vibrations can be transmitted to the liquid crystal display device 11.

The small vibration actuator 17 is the linear actuator 24, which is one kind of the inertial actuators. The small vibration actuators 17 are isolated from the base member 12 and mounted on the liquid crystal display device 11. According to such a configuration, the linear actuator 24, which is the small vibration actuator 17 and is one kind of the inertial actuators, can transmit small vibrations to the liquid crystal display device 11. The small vibration actuators 17 need not be mounted on the base member 12.

Second Embodiment

A second embodiment of the present invention will be described with reference to FIGS. 16 to 20. The second embodiment includes an elastic member 115 that is different from that in the first embodiment. Configurations, operations, and effects similar to those in the first embodiment will not be described.

Figure 16:
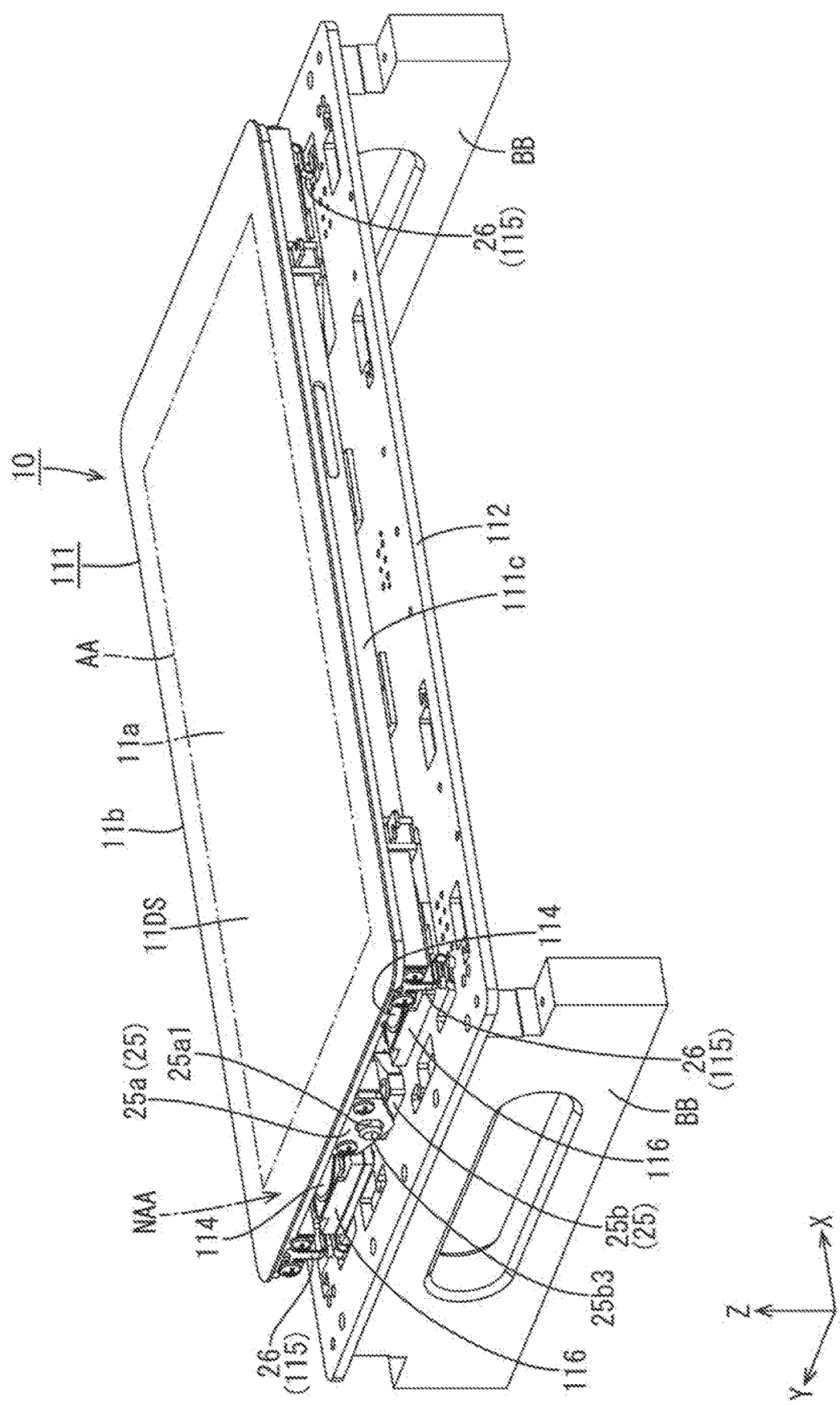
FIG. 16 is a perspective view of an input device according to a second embodiment of the present invention.
Figure 17:
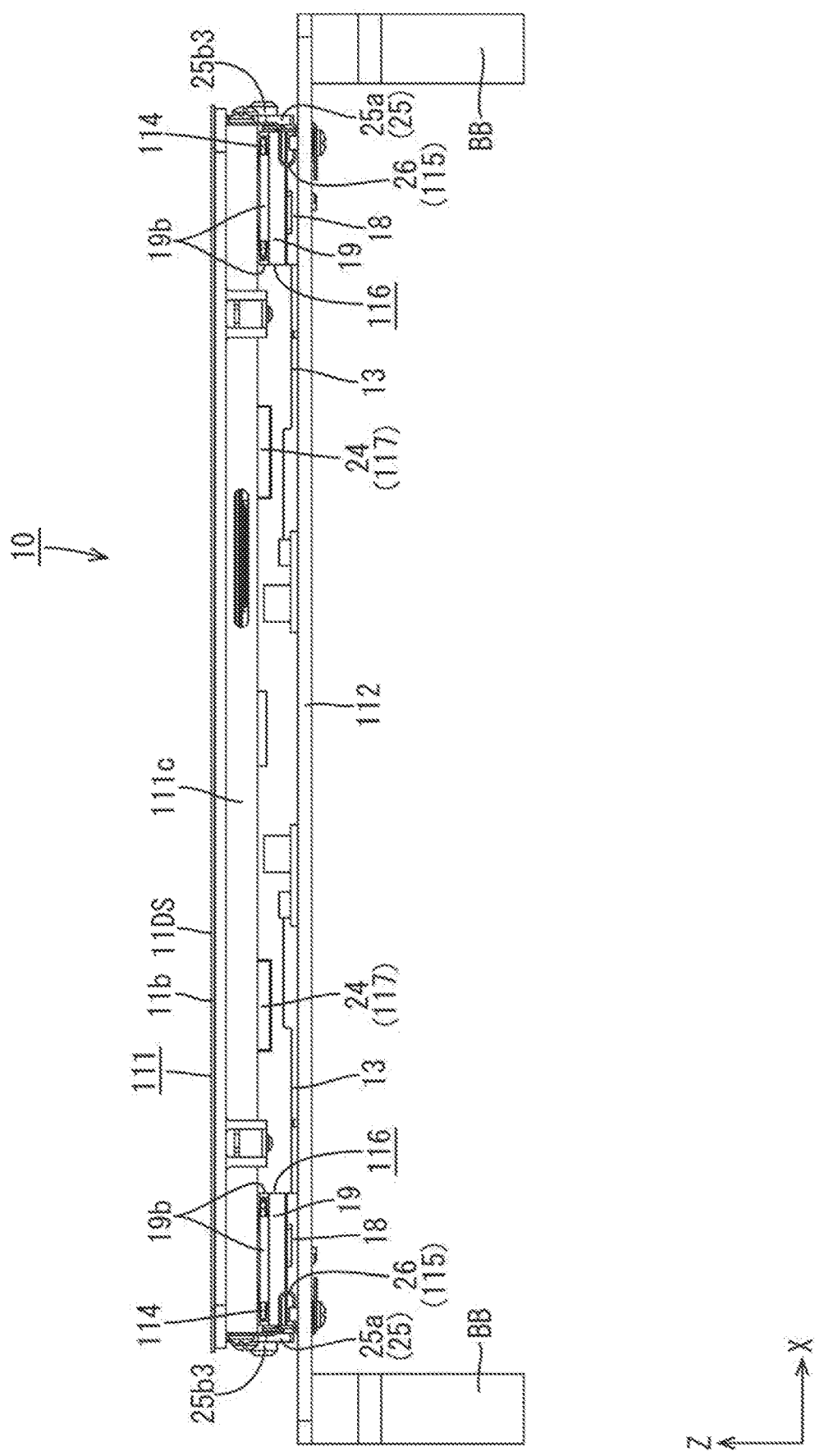
FIG. 17 is a side view of the input device.
Figure 18:
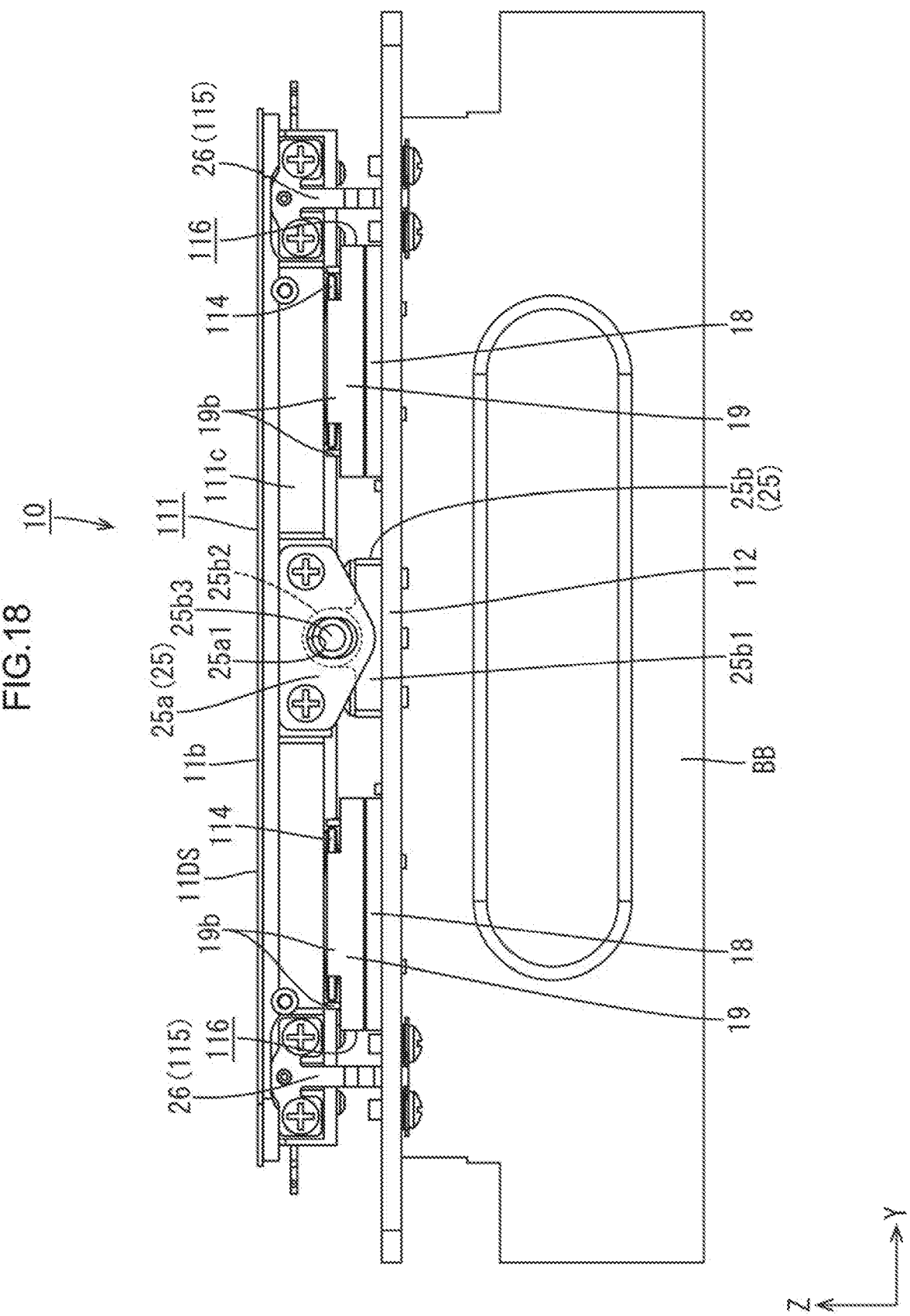
FIG. 18 is a front view of the input device.

As illustrated in FIG. 16, the elastic member 115 in this embodiment is a leaf spring member 26 that is obtained by pressing a metal plate. As illustrated in FIGS. 16 to 18, four leaf spring members 26, which are the elastic members 115, are disposed near four corner portions of a liquid crystal display device 111 and a base member 112, respectively. The leaf spring members 26 are arranged outside actuator units 116, which are arranged similarly near the four corners of the liquid crystal display device 111 and the base member 112, with respect to the Y-axis direction and a portion of the leaf spring member 26 (a second spring portion 26b which will be described later) overlaps the actuator unit 116 with respect to the X-axis direction.

Figure 19:
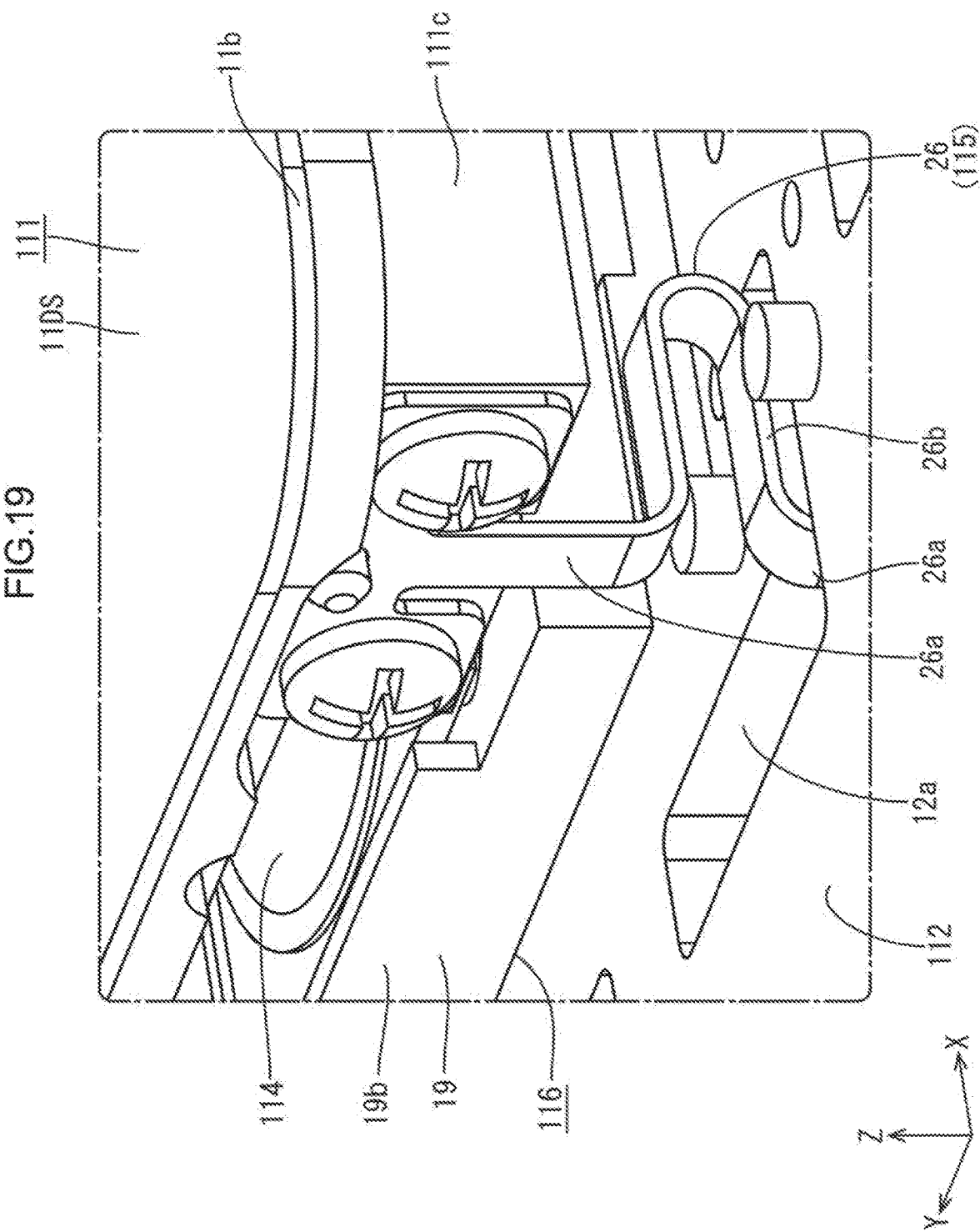
FIG. 19 is an enlarged perspective view of an elastic member included in the input device and therearound.
Figure 20:
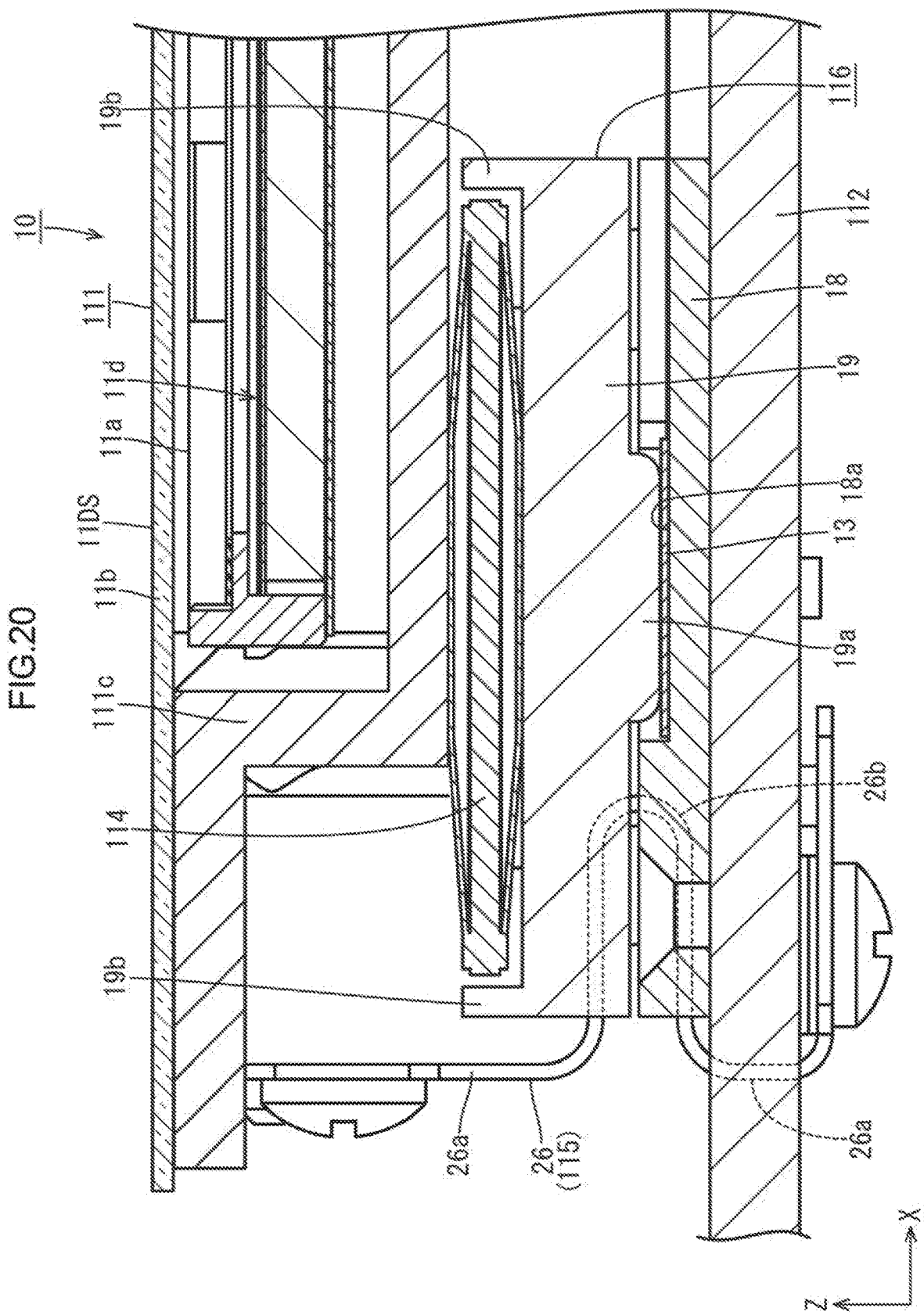
FIG. 20 is a side sectional view of an actuator unit included in the input device.

As illustrated in FIGS. 19 and 20, the leaf spring member 26 includes a pair of first spring portions 26a extending along substantially the Z-axis direction (the pressing direction, the first direction) and a second spring portion 26b that extends continuously from the pair of first spring portions 26a along substantially the X-axis direction (a direction crossing the pressing direction, the second direction) and is curved. The pair of first spring portions 26a include one disposed on the front side in the Z-axis direction and another one disposed on the back side. One end portion of the first spring portion 26a on the front side is fixed to the liquid crystal display device 111. One end portion of the first spring portion 26a on the back side is fixed to the base member 112. The one end portion of the first spring portion 26a on the front has a wide shape and is fixed to the outer surface of a casing 111c of the liquid crystal display device 111 with two screw members. The first spring portion 26a on the back side extends to the back surface side of the base member 112 through a hole 12a formed in the base member 112 and is bent such that the one end portion of the first spring portion 26a on the back side extends in parallel to the back surface of the base member 112. The parallel extending portion is fixed to the base member 112 with a screw member. In this manner, the first spring portion 26a on the back side extends through the base member 112. Accordingly, the creepage distance of the leaf spring member 26 becomes longer by about the thickness dimension of the base member 112 than that of a leaf spring member disposed by using only the space between the liquid crystal display device 111 and the base member 112. The pair of first spring portions 26a are configured to elastically deform in a cantilever manner with respect to the X-axis direction with the attachment positions thereof on the liquid crystal display device 111 and the base member 112 as fulcrum points. The second spring portion 26b has a laid "U" shape in a side view and the two end portions thereof are continuous to the other end portions of the pair of first spring portions 26a. The second spring portion 26b extends continuously from the pair of first spring portions 26a along the X-axis direction toward the inner side (the center) of the liquid crystal display device 111 and is curved. The second spring portion 26b is configured to elastically deform with respect to the Z-axis direction with the curved portion as a fulcrum point.

As described above, as illustrated in FIGS. 19 and 20, the leaf spring member 26, which is the elastic member 115, is configured to elastically deform in both the X-axis direction and the Z-axis direction, thus supporting the liquid crystal display device 111 so as to be elastically displaced relative to the base member 112 in the X-axis direction and the Z-axis direction. Therefore, when the liquid crystal display device 111 is pressed by the touch operation or when a large vibration actuator 114 oscillates, the second spring portion 26b that is included in the leaf spring member 26 (the elastic member 115) and extends along the X-axis direction and is curved is elastically deformed with respect to the Z-axis direction. On the other hand, when a small vibration actuator 117 oscillates, the first spring portions 26a that are included in the leaf spring member 26 (the elastic member 115) and extend along the Z-axis direction is elastically deformed with respect to the X-axis direction. Thus, the first spring portions 26a and the second spring portion 26b included in the leaf spring member 26, which is the elastic member 115, are elastically deformed to smooth the relative displacement movement of the liquid crystal display device 111 with respect to the base member 112.

As described above, according to the present embodiment, the elastic member 115 includes the pair of first spring portions 26a that extend along the first direction and one ends of which are fixed to the liquid crystal display device 111 or the base member 112 and the second spring portion 26b that extends continuously from another ends of the pair of first spring portions 26a along the second direction and is curved. According to such a configuration, when the liquid crystal display device 111 is pressed by the touch operation or when the large vibration actuator 114 oscillates, the second spring portion 26b that is included in the elastic member 15 and extends along the second direction and is curved is elastically deformed with respect to the first direction. When the small vibration actuator 117 oscillates, the first spring portions 26a that are included in the elastic member 115 and extend along the first direction is elastically deformed with respect to the second direction. Thus, the first spring portions 26a and the second spring portion 26b included in the elastic member 115 are elastically deformed to smooth the relative displacement movement of the liquid crystal display device 111 with respect to the base member 112.

Third Embodiment

A third embodiment of the present invention will be described with reference to FIGS. 21 and 22. In the third embodiment, arrangement of small vibration actuators 217 is altered from that of the first embodiment. Configurations, operations, and effects similar to those in the first embodiment will not be described.

Figure 21:
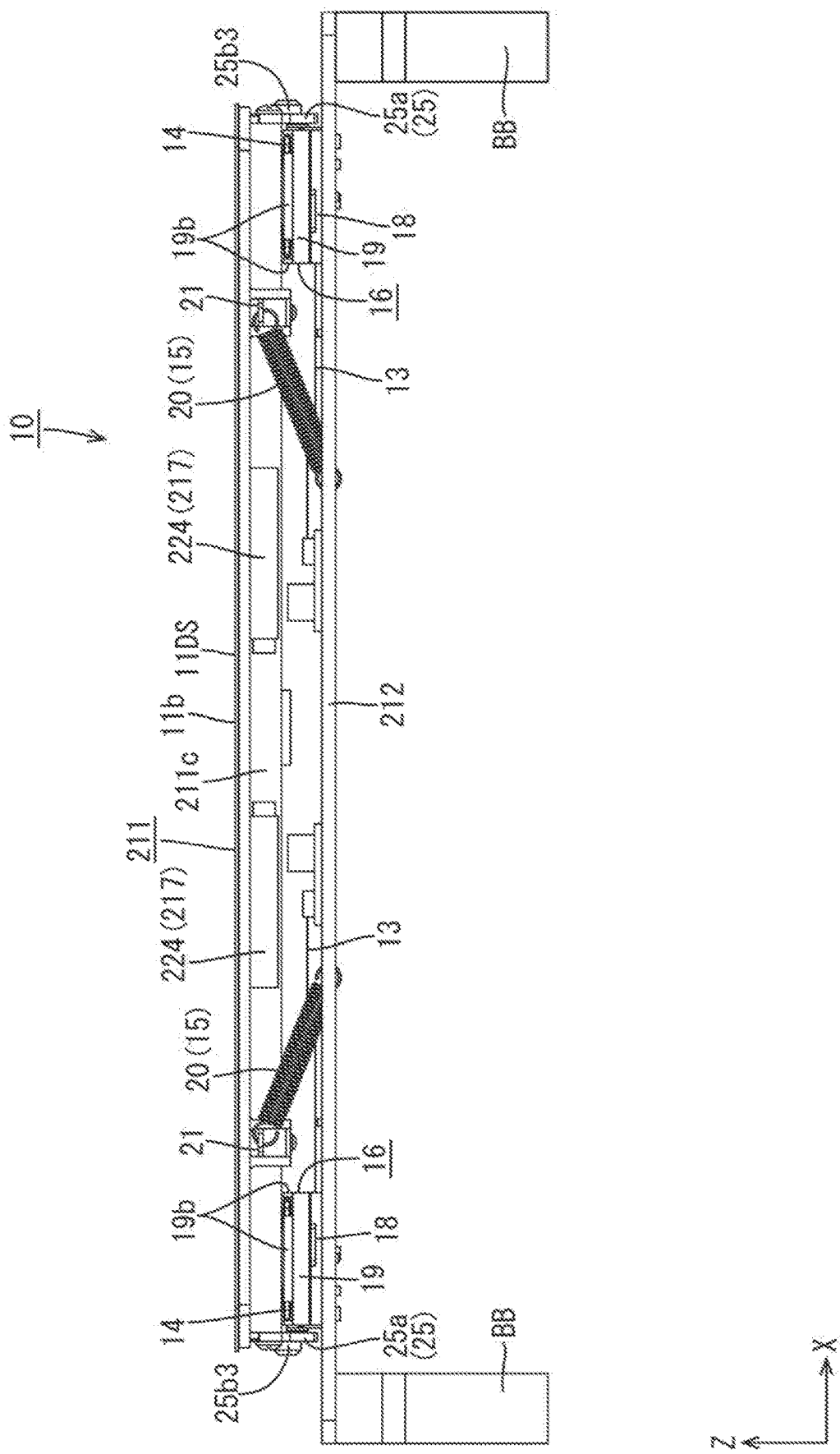
FIG. 21 is a side view of an input device according to a third embodiment of the present invention.
Figure 22:
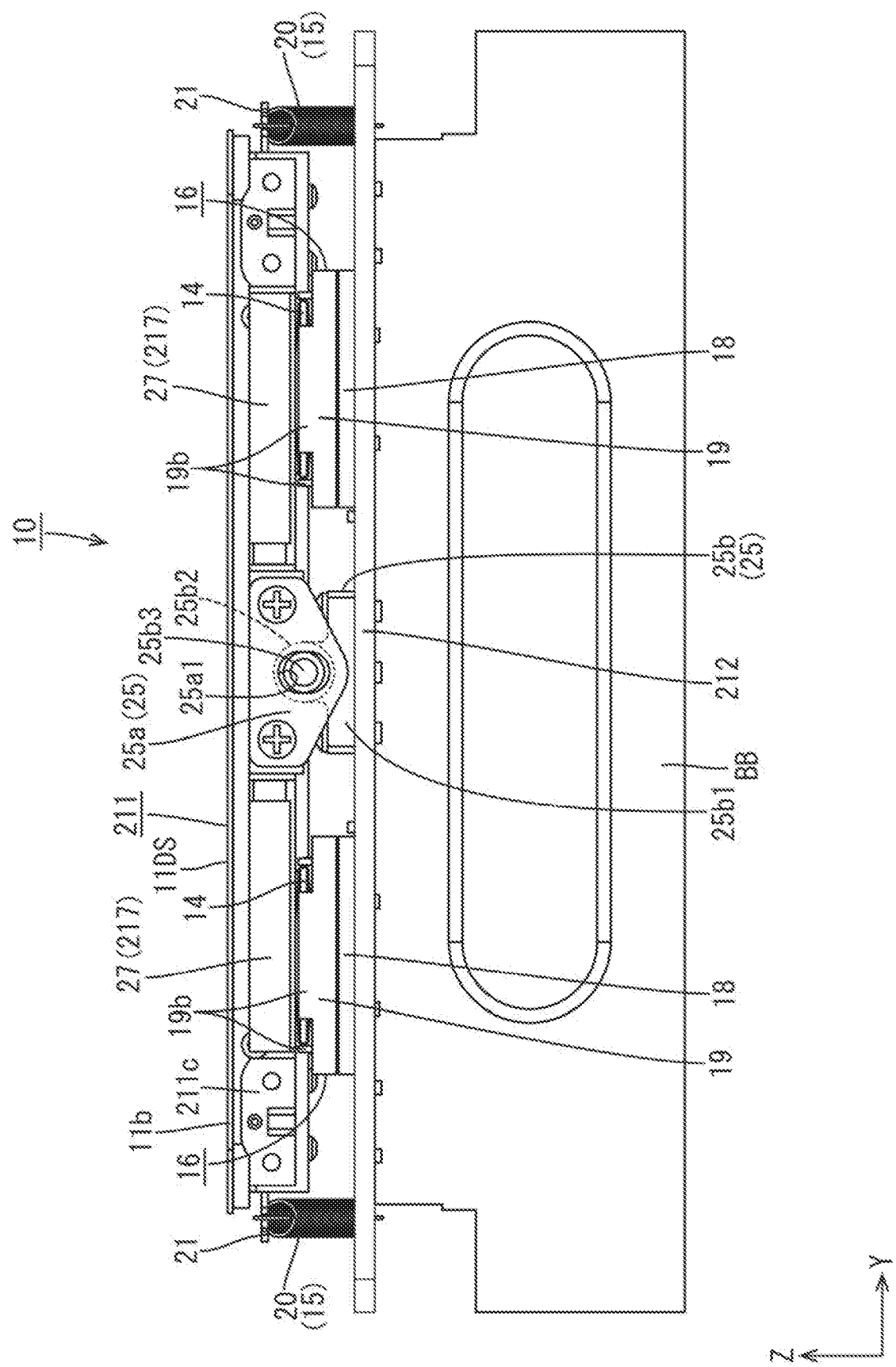
FIG. 22 is a front view of the input device.

As illustrated in FIGS. 21 and 22, the small vibration actuators 217 are mounted on an outer surface of a liquid crystal display device 211. In details, in this embodiment, the small vibration actuators 217 include linear actuators 224, which are similar to those in the first embodiment, and piezoelectric actuators 27 (piezo actuators), which are one kind of the inertial actuators similar to the linear actuators 224. According to such a configuration, compared to the configuration of the first embodiment in which the small vibration actuators 17 are mounted on a surface of the liquid crystal display device 11 opposite the base member 12 (refer FIG. 11), the small vibration actuators 217 are less likely to be contacted with the components mounted on a base member 212. Accordingly, the components can be arranged on the base member 212 in various ways.

The piezoelectric actuator 27 includes a piezoelectric element (a piezo element) as an oscillation source and the inverse piezoelectric effects occur in the piezoelectric actuator 27. Each piezoelectric actuator 27 has a thin elongated block shape extending along the Y-axis direction and oscillates in the thickness direction thereof. As illustrated in FIG. 22, the piezoelectric actuators 27 are attached on short-side outer surfaces of a casing 211c of the liquid crystal display device 211. The piezoelectric actuators 27 attached on the short-side outer surfaces extending along the Y-axis direction such that longitudinal direction and the thickness direction thereof correspond to the Y-axis direction and the X-axis direction, respectively. Two piezoelectric actuators 27 are mounted on each of the two short-side outer surfaces of the casing 211c so as to have a space therebetween with respect to the Y-axis direction. On the other hand, as described in the first embodiment, the linear actuators 224 that extend along the X-axis direction and oscillate in the longitudinal direction thereof are mounted on long-side outer surfaces of the casing 211c of the liquid crystal display device 211. The linear actuators 224 are mounted on the long-side outer surfaces extending along the X-axis direction such that the thickness direction and the longitudinal direction thereof correspond to the Y-axis direction and the X-axis direction, respectively. Two linear actuators 224 are mounted on each of the two long-side outer surfaces of the casing 211c so as to have a space therebetween with respect to the X-axis direction.

As described above, according to this embodiment, the small vibration actuators 217 are mounted on the outer surface of the liquid crystal display device 211. Accordingly, compared to the configuration in which the small vibration actuators are mounted on a surface of the liquid crystal display device opposite the base member, the small vibration actuators 217 are less likely to be contacted with the components mounted on the base member 212. Accordingly, the components can be arranged on the base member 212 in various ways.

Other Embodiments

The present invention is not limited to the embodiments, which have been described using the foregoing descriptions and the drawings. For example, embodiments described below are also included in the technical scope of the present invention.

(1) In each of the above embodiments, the vibration direction of the small vibration actuators corresponds to the X-axis direction that is perpendicular to the pressing direction of the touch operation; however, the vibration direction of the small vibration actuators may correspond to the Y-axis direction that is perpendicular to the pressing direction of the touch operation.

(2) In each of the above embodiments, the vibration direction of the large vibration actuators corresponds to the Z-axis direction (the pressing direction) and the vibration direction of the small vibration actuators correspond to the X-axis direction (the direction perpendicular to the pressing direction); however, the vibration direction of the large vibration actuators may correspond to the X-axis direction (the direction perpendicular to the pressing direction) and the vibration direction of the small vibration actuators may correspond to the Z-axis direction (the pressing direction). In such a configuration, the vibrating direction of the large vibration actuators may correspond to the Y-axis direction.

(3) In each of the above embodiments, the vibration direction of the large vibration actuators and the vibration direction of the small vibration actuators are perpendicular to each other; however, the vibration direction of the large vibration actuators and the vibration direction of the small vibration actuators may be parallel to each other. Namely, the vibration direction of the large vibration actuators and the vibration direction of the small vibration actuators may correspond to the Z-axis direction, or may correspond to the X-axis direction or the Y-axis direction.

(4) In each of the above embodiments, vibrations created by the large vibration actuators in the oscillation thereof are greater than the vibrations created by the small vibration actuator in all of the displacement, the speed, and the acceleration. However, the large vibration actuators may create vibrations that are greater than those created by the small vibration actuators only in the acceleration that is particularly important for the user to recognize the vibration among the displacement, the speed, and the acceleration at the time of oscillation. The displacement and the speed of the vibrations created by the large vibration actuators may be same or decreased.

(5) In each of the above embodiments, the piezoelectric element is used as the oscillation source of the large vibration actuators including the displacement magnification mechanisms. However, the large vibration actuators may include an oscillation source other than the piezoelectric element.

(6) Each of the above embodiments includes the large vibration actuators including the displacement magnification mechanisms; however, the large vibration actuators may not include the displacement magnification mechanisms. In such a configuration, electromagnetic actuators (solenoid actuators) that are suitable to create large vibrations are used as the large vibration actuators.

(7) In each of the above embodiments, the linear actuators and the piezoelectric actuators, which are inertial actuators, are used as the small vibration actuators; however, the inertial actuators other than the above ones may be used. Other kinds of actuators than the inertial actuators may be used as the small vibration actuators.

(8) In each of the above embodiments, two kinds of actuators that create vibrations of different intensities are used; however, three or more kinds of actuators that create vibrations of different intensities may be used.

(9) In each of the above embodiments, the large vibration actuators are contacted directly with the liquid crystal display device. However, another component may be disposed between the large vibration actuators and the liquid crystal display device.

(10) In each of the above embodiments, a single controller controls each of the driving circuits and the circuits; however, multiple controllers may be included and each of the controllers may control each of or some of the driving circuits and the circuits.

(11) In each of the above embodiments, the actuator units (the pressure sensors and the large vibration actuators) are arranged near the four corner portions of the liquid crystal display device and the base member. However, the specific number and the specific arrangement of the actuator units with respect to the liquid crystal display device and the base member may be altered as appropriate. The specific number and the specific arrangement of the small vibration actuators may be altered as appropriate.

(12) In each of the above embodiments, the actuator unit includes the pressure sensor and the large vibration actuator. However, a pressure sensor may be included in separately from the actuator unit including the large vibration actuator. In such a configuration, a holding member for holding the pressure sensor needs to be included separately from the actuator unit.

(13) In the first and third embodiments, the tension coil spring, which is the elastic member, is arranged such that the axial direction thereof is inclined with respect to the X-axis direction and the Z-axis direction. However, the tension coil spring may be arranged such that the axial direction thereof is inclined with respect to the Y-axis direction and the Z-axis direction. The axial direction of the tension coil spring may be parallel to one of the X-axis direction, the Y-axis direction, and the Z-axis direction.

(14) In the second embodiment, the second spring portion of the leaf spring member, which is the elastic member, has a laid "U" shape in a side view; however, the specific shape of the second spring portion may be altered as appropriate. Specifically, for example, the second spring portion may have a laid "V" shape or a laid "W" shape in a side view. Namely, the curved portion of the second spring portion may not necessarily have a curved shape but may be configured with straight lines.

(15) In the second embodiment, the second spring portion of the leaf spring member, which is the elastic member, has only one curved portion but may have two or more curved portions.

(16) Each of the above embodiments includes the pressure sensor of a pressure-sensitive ink type but may include a pressure sensor of a piezoelectric element type.

(17) Each of the above embodiments includes a pair of actuators. However, the number of the actuators may be one, three or more.

(18) In each of the above embodiments, the electromagnetic actuators are used as the actuators. However, the inertial actuators such as piezoelectric actuators and linear actuators may be used as the actuators. In such a configuration, the inertial actuators are not arranged on the base member but are arranged only on the liquid crystal display device.

(19) Each of the above embodiments includes the in-cell type touch panel pattern that is integrated in the liquid crystal panel. However, the out-cell type touch panel pattern that is included on the front side of the liquid crystal panel may be used.

(20) Each of the above embodiments includes the self-capacitive type touch panel pattern. However, a mutual-capacitive type touch panel pattern may be used. The planar shape of the touch electrode included in the touch panel pattern may be a quadrangle, a circle, a pentagon, or a polygon having more than five corners in addition to a diamond shape as appropriate.

(21) In each of the above embodiments, the liquid crystal display device includes the touch panel pattern. However, the liquid crystal display device may not include a touch panel pattern.

(22) In each of the above embodiments, the input device (the liquid crystal display device and the base member) has a horizontally long quadrangular plan view shape. However, the plan view shape of the input device may be a quadrangle, a square, an oval, an ellipse, a circle, a trapezoid, or a shape partially having a curved outline.

(23) Other than each of the above embodiments, specific uses of the input device may be altered as appropriate.

(24) In each of the above embodiments, the liquid crystal display device includes the liquid crystal panel. However, liquid crystal display devices including other types of display panels (e.g., plasma display panels (PDPs), organic EL panels, electrophoretic display panels (EPDs), and micro electro mechanical systems (MEMS) display panels) may be used.

EXPLANATION OF SYMBOLS

10: Input device, 11, 111, 211: Liquid crystal display device (Input member), 11TP: Touch panel pattern, 12, 112, 212: Base member, 13: Pressure sensor, 14, 114: Large vibration actuator, 15, 115: Elastic member, 17, 117, 217: Small vibration actuator, 20, 120: Tension coil spring, 24, 224: Linear actuator (Inertial actuator), 25: Protrusion and recess fitting structure, 26a: First spring portion, 26b: Second spring portion, 27: Piezoelectric actuator (inertial actuator), 30: Controller, FIN: Finger (inputter)

The invention claimed is:

1. An input device comprising:
an input member to which a touch operation is input;
a touch panel pattern included in the input member and configured to detect an input position of the touch operation;
a base member on which the input member is mounted;
a pressure sensor disposed on the base member and detecting a pressure that acts on the input member when the input member is pressed by the touch operation;
a small vibration actuator configured to apply relatively small vibration to the input member;
a large vibration actuator configured to apply relatively large vibration to the input member; and
a controller configured to control driving of the small vibration actuator and the large vibration actuator based on the input position detected by the touch panel pattern and the pressure detected by the pressure sensor;
wherein the small vibration actuator vibrates the input member in a direction perpendicular to a pressing direction in which the touch operation is performed, and the large vibration actuator vibrates the input member in the pressing direction.

2. The input device according to claim 1, wherein the large vibration actuator and the pressure sensor overlap each other.

3. The input device according to claim 2, wherein
the input member has a quadrangular plan view shape, and
the large vibration actuator includes large vibration actuators and the pressure sensor includes pressure sensors, and the large vibration actuators and the pressure sensors are disposed at four corner portions of the input member, respectively.

4. The input device according to claim 1, further comprising an elastic member mounted on the input member and the base member and being elastically deformable in a first direction that is a vibrating direction of the large vibration actuator and in a second direction that is a vibrating direction of the small vibration actuator.

5. The input device according to claim 4, wherein the elastic member is a tension coil spring, and one end of the tension coil spring is fixed to the input member and another end thereof is fixed to the base member.

6. The input device according to claim 4, wherein
the elastic member includes a pair of first spring portions and a second spring portion,
the first spring portions extend along the first direction and one end portions of the first spring portions are respectively fixed to the input member or the base member, and
the second spring portion is continuous from another ends of the first spring portions and extends along the second direction and is curved.

7. The input device according to claim 1, further comprising a protrusion and recess fitting structure including fitting components mounted on the input member and the base member and fitted to each other, the protrusion and recess fitting structure configured to allow the input member to relatively move with respect to the base member in a first direction that is a vibrating direction of the large vibration actuator and in a second direction that is a vibrating direction of the small vibration actuator and restrict relative movement of the input member with respect to the base member in a third direction that is perpendicular to the first direction and the second direction.

8. The input device according to claim 1, wherein the large vibration actuator at least includes an oscillation source that causes vibration and a displacement magnification mechanism that magnifies displacement created according to oscillation of the oscillation source.

9. The input device according to claim 1, wherein the small vibration actuator is an inertial actuator that is separated from the base member and mounted on the input member.

10. An input device comprising:
an input member to which a touch operation is input;
a touch panel pattern included in the input member and configured to detect an input position of the touch operation;
a base member on which the input member is mounted;
a pressure sensor disposed on the base member and detecting a pressure that acts on the input member when the input member is pressed by the touch operation;
a small vibration actuator configured to apply relatively small vibration to the input member;
a large vibration actuator configured to apply relatively large vibration to the input member; and
a controller configured to control driving of the small vibration actuator and the large vibration actuator based on the input position detected by the touch panel pattern and the pressure detected by the pressure sensor;
wherein the small vibration actuator vibrates the input member in a direction perpendicular to a pressing direction in which the touch operation is performed, and the large vibration actuator vibrates the input member in the pressing direction;
wherein the small vibration actuator is an inertial actuator that is separated from the base member and mounted on an outer surface of the input member.

* * * * *